United States Patent [19]

Le Lann et al.

[11] Patent Number: 4,847,835
[45] Date of Patent: Jul. 11, 1989

[54] PROCESS AND DEVICE FOR THE TRANSMISSION OF MESSAGES BETWEEN DIFFERENT STATIONS THROUGH A LOCATION DISTRIBUTION NETWORK

[75] Inventors: Gérard Le Lann, Paris; Pierre Rolin, Les Ulis, both of France

[73] Assignee: Inria Institute National de Recherche en Informatique et an Automatique, Le Chesnay, France

[21] Appl. No.: 820,254

[22] Filed: Nov. 5, 1985

[30] Foreign Application Priority Data

Nov. 7, 1984 [FR] France .................. 84 16957

[51] Int. Cl.⁴ .................................. H04Q 9/00
[52] U.S. Cl. ........................ 370/85; 340/825.5
[58] Field of Search ............ 340/825.5; 370/85, 87

[56] References Cited

U.S. PATENT DOCUMENTS

| | | | |
|---|---|---|---|
| 4,199,661 | 4/1980 | White et al. | 340/825.5 |
| 4,506,361 | 3/1985 | Kume | 340/825.5 |
| 4,513,427 | 4/1985 | Borriello et al. | 375/87 |
| 4,531,238 | 7/1985 | Rawson et al. | 340/825.5 |
| 4,593,282 | 6/1986 | Acampora et al. | 370/85 |
| 4,598,285 | 7/1986 | Hoshen | 370/85 |
| 4,628,311 | 12/1986 | Milling | 370/85 |
| 4,630,264 | 12/1986 | Wah et al. | 370/85 |

FOREIGN PATENT DOCUMENTS

| | | | |
|---|---|---|---|
| 0088906 | 8/1988 | European Pat. Off. | 370/85 |
| 2126848 | 3/1984 | United Kingdom . | |

OTHER PUBLICATIONS

"The Multi-Accessing Tree Protocal", by Capetanakis IEEE Trans. on Comm. vol. Com. 27, #10, 10/10/79.

*Primary Examiner*—Salvatore Cangialosi
*Attorney, Agent, or Firm*—Herbert Dubno

[57] ABSTRACT

In a message transmission network of CSMA-CD type, each station is connected by a coupler to the common transmission channel. One or more indices is allocated to each coupler; and each coupler is provided with an automatic device capable of establishing a predetermined sequence of index sub-sets, such as a dichotomous tree. A counter of period E progresses at the rate of the end of channel phase orders. The coupler freely transmits only if its count E is at zero. When a collision appears in this state, the counter E starts from a chosen forced state, and all the couplers put their automatic devices into action, which also progress at the rate of the ends of channel phases, to establish sub-sets of said sequence and to determine, by comparison of their own indices with said sub-sets, whether they have in any given channel phase again obtained the right to transmit on said common channel. The couplers will subsequently be able to transmit one by one without collision.

29 Claims, 11 Drawing Sheets

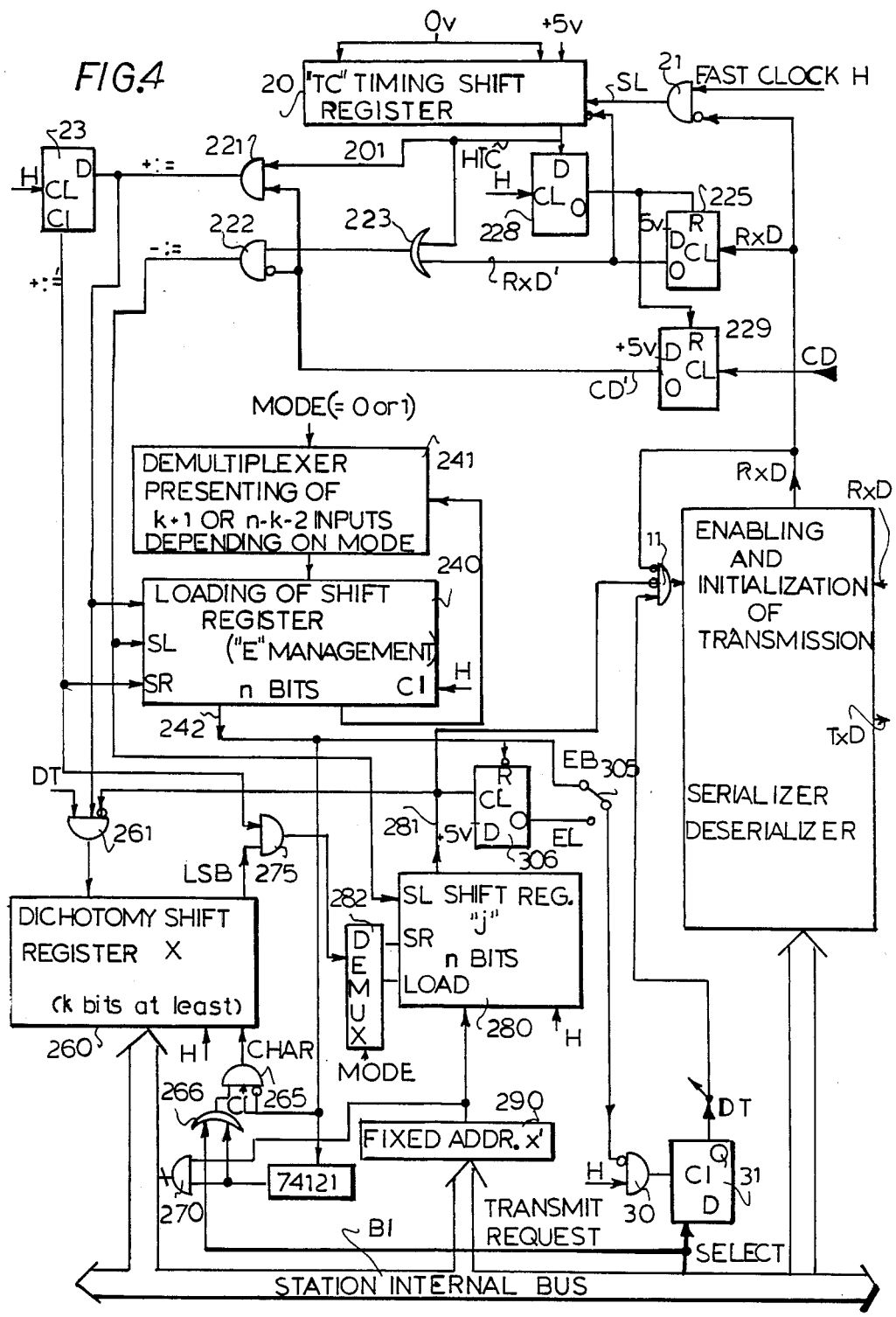

PROCESS AND DEVICE FOR THE TRANSMISSION OF MESSAGES BETWEEN DIFFERENT STATIONS THROUGH A LOCATION DISTRIBUTION NETWORK

FIELD OF THE INVENTION

The invention relates to the automatic transmission of information between equipment at different sites which are interconnected by a local distribution network.

BACKGROUND OF THE INVENTION

In a local distribution network, the medium for the transmission of information between the various pieces of equipment is of a type which enables each piece of equipment to discern the transmitted messages. The physical means used to generate the elementary signals of the messages can be any whatsoever. The message can for example be defined in electromagnetic form, i.e. carried by electrons, or in optical form, i.e. carried by photons.

As for the media of a distributed communication, they can be passive, semi-passive or active. They are called passive when they do not include any units having the function of regenerating or amplifying the signals of the message. (Such units naturally require the use of an external power source). The media are called semi-active when they contain such regenerating or amplifying units. Finally, active media include units whose function is to modify all or part of the signals of the message during their passage. The present invention applies to these different categories of distribution media, noting that the active media mentioned last can in certain cases have application peculiarities.

The automated pieces of equipment that are going to be interconnected by the network can be any whatsoever. They can for example be sensors/activators, programmable robots, controllers/regulators, data processing terminals, computers, telephonic pieces of equipment or video terminals.

These equipments are connected to access stations which manage the communications on the shared medium or media. Each station operates independently and asynchronously with respect to the other stations. Each station is physically connected to the distribution medium that it shares with the other stations, by means of hardware and software assembly called a coupler.

Thus the function of a coupler is to provide the generation and reception of the physical signals on the communications medium, and to carry out an access protocol managing the sharing of that medium and the transmission and reception of information structured in the form of messages.

The present invention relates more particularly to the functioning of these couplers.

There are as many couplers as there are stations connected to the local network. In principle, they are all identical. The only common resource shared by the stations is therefore the physical communications medium. The couplers operate asynchronously and cannot instantaneously know what the other couplers are doing at any time. Such a system gives rise to the possibility of an attempt to simultaneously transmit different messages originating from several couplers. Such an attempt at simultaneous transmission causes what is called a collision.

DESCRIPTION OF THE PRIOR ART

In the field of data processing networks there is a known technique, called CSMA (Carrier Sense Multiple Access). According to this technique, when a coupler decides to transmit a message, it must first monitor the communications medium. A coupler only has the right to transmit when no other transmission is in progress.

However, as signal propagation delays on the communications medium are not zero, it is possible for several stations to detect the absence of transmission at the same time and to then transmit their messages. A collision therefore occurs.

The French Pat. No. 2 306 478, of XEROX CORPORATION, proposes a protocol enabling such collisions to be detected and the management of the retransmissions after collision detection (retransmission as it is assumed that the initial attempt at transmission has been unsuccessful because of the collision).

In its current developments, the protocol in question is known under the name of CSMA-CD/BEB (Collision Detection and Binary Exponential Backoff). In particular refer to the document: The Ethernet Local Network: Three Reports, published by Xerox, Palo Alto Research Center, United States of America, February 1980.

The disadvantage of this known protocol is that it is probabilistic. In fact, it can only guarantee with certainty that a message submitted to the communications medium by a specified station will be able to be successfully transmitted over the medium within a finite time, likely to be fixed a priori. If an urgent message has to be transmitted, i.e. one that has priority with respect to the other messages, it will be subject to the same rules as a non-urgent message having no priority and because of this there is the possibility that the urgent message will not be transmitted within the required time.

Now, numerous automatic and data processing systems operating in real time impose that all or some of the messages produced by the process of equipment be transmitted within finite times, extremely limited, the limits being known a priori.

In a very different context, in which the transmission is carried out within predetermined time slots in a way that is common to all the equipments, this problem has been studied by J. I. Capetanakis, in the article entitled "Generalized TDMA: The Multi-accessing Tree Protocol", IEEE Transactions on Communications, Vol 1, Com 27, No 10, October 1979. Capetanakis proposes a collision resolution algorithm for transmission media of satellite channel type. Besides the fact that it applies to long range communications media, as a geostationary satellite is situated 36,000 kilometers from the Earth, the proposed algorithm brings the following considerations into effect:

The satellite channel is synchronous, all of the couplers each having a physical clock that is perfectly synchronous with all the other clocks, and the messages are only transmitted within perfectly specified and all equal time slots (this is the principle of the TDMA (Time Division Multiple Access) system).

There is no absolute or relative priority between couplers or messages.

Each message exactly occupies a time slot.

It is immediately apparent that the propositions made by Capetanakis cannot be transposed to CSMA-CD type protocols, the operation of which is completely different from those of TDMA transmissions. In addition, Capetanakis does not explain under what rules a coupler, involved or not involved in a collision, knows if it again has the right to transmit. Finally, the algorithm proposed by Capetanakis does not deal with the case of errors or of failures.

It remains therefore that, in known networks of CSMA-CD type, a collision is resolved in a probabilistic way, as previously mentioned. In the case of a collision between urgent messages, there is no possibility of guaranteeing their transmission within a fixed a priori time.

OBJECTS OF THE INVENTION

In these conditions, the present invention has the object of providing a solution to the problems that have just been described.

More precisely, an object of the invention is to provide a new process and a new device which have the following features:

The process can be a process with options, it being possible to select each option at the time of manufacture of the couplers or at the time of their installation after manufacture.

When the options are selected on installation, it is possible to change the option while using the network or communications system, without it being necessary to completely stop its operation.

A first option, corresponding with a mode called "general", manages couplers generating mixed periodic and aperiodic traffic.

Another option, corresponding with a mode called "periodic", specifically manages couplers generating periodic traffic.

The process does not impose any particular upper limit to the size of the messages.

All the messages submitted for transmission on the physical medium are transmitted within a finite time, the upper limit of which is known a priori for a given maximum message size, whether or not collisions occur. When a collision occurs, the time necessary to completely resolve this collision is called a period.

When the messages or the names of the couplers are distributed over several classes of different priority, the order of transmission of messages in collision is carried out within a period in the order of priority.

Within a period, each coupler can transmit any fixed number of messages. This number can be fixed when the couplers are installed or can be modified during the operation of the communications system.

The appearance of a complete failure of a coupler, of a transmission error or of a withdrawal of a coupler does not cause an overall failure of the system. And it is possible to insert a new coupler or to remove one without interrupting the operation of the system.

SUMMARY OF THE INVENTION

The process can tolerate faulty behavior (such as spurious interference) provided that this behavior is detected by all the couplers. More generally, the process has the same reliability properties as the CSMA-CD process.

In the absence of collisions, the mode of access to the medium is of CSMA-CD type. The proposed process is integrated into the units installing the CSMA-CD/BEB protocol.

As will be seen later, when the general mode is selected, the system continuously alternates between the following two operating states:

the "Period in progress" state: a period is precisely defined as the time interval between the appearance of a collision while the channel is in the "out of period" state and the complete resolution of that collision; collisions can occur during a period; the access mode is called "slotted" and is defined by the process described in the present document.

the "out of period" state: all previous collisions have been resolved; the access mode is called "random" (CSMA-CD).

When the periodic mode has been selected, the system is permanently in the "period in progress" state, each period being preceded by a general collision detected by the CSMA-CD process. In this mode, in the absence of an operations faults, no collision can occur during a period.

The invention also enables the range of traffic classes managed by CSMA-CD/BEB type protocols to be extended. In particular, the process of the invention for the deterministic resolution of collisions provides efficient management of message traffic of periodic type as well as of traffic with multiple priorities.

For a better understanding of the invention, reference is made to previously mentioned French Pat. No. 2 306 478, as well as to the IEEE standard 802.3, which describes the general characteristics of ETHERNET type networks.

In the following, the propagation time of signals from one end to the other of the communications medium is identified as p. TC refers to a duration greater than twice p and defined as being the "channel slot" (channel slot time in the previously mentioned IEEE 802.3 standard).

According to the invention, "channel phase" refers to the time interval corresponding to either a complete and successful transmission of a message of any length whatsoever at least equal to TC, or to a channel slot in which a collision occurs (with the corresponding interferences) or to a channel slot of silence, with neither transmission nor collision.

The process is of the type called CSMA-CD, in which:

each station is provided with at least one coupler which connects it to a common distributed transmission channel, each coupler is capable of transmission-reception on this channel, in asynchronous mode, defining a transition at each end of transmission or reception, (in general transmission is indicated by the presence of a carrier on the channel and the transitions are defined from this carrier), each coupler continuously monitors the said channel and examines it for a predetermined time, which is the channel slot, after each transition, a coupler can only begin to transmit a message, at the request of its station, in the absence of any signal (carrier) on the channel, whereas it interrupts or invalidates its transmission if, during the corresponding channel slot, a signal indicating a collision appears, such as an interference, manifesting a simultaneous start of transmission by several couplers.

In general, the invention is characterized by the following combination of means:

initially, each coupler is allocated at least one index that is its own index chosen from a predetermined set of indices, and each coupler is provided with an automatic device which has a rest state and a working state, called a period, in which it produces a predetermined sequence of index subsets, structured in order to be able to result in successive choices of just one of the indices, and to thus be able to cover the complete set of indices, the said sequence including a maximum number of steps which depends on its structure and on the total number of indices, a step change command, called an end of channel phase, is produced in each coupler at the end of any channel slot in which there has been silence or collision, or at the end of the successful transmission of a message, in each coupler, at least one count is made which progresses at the rate of the ends of channel phases and depending on the presence or absence of collision during each channel phase up to a chosen reference value, a coupler is only authorized to transmit freely if its count is at the reference value, and in the presence of a collision when the said count is at its reference value, all the couplers in service set their counts to a chosen forced value, while at least the active couplers, i.e. those which have transmitted during the collision, set their automatic devices to the working or period state, and make them go through the said sequence at the rate of the ends of channel phases, while only the couplers having an index belonging to the subset designated by this step are authorized to transmit a message associated with that index, the forced value and the reference value being chosen in such a way that the count only returns to the reference value after the complete resolution of the collision that caused the period, the couplers then being again authorized to transmit freely, while the automatic devices return to their rest state.

This enables any collision to be resolved in a limited time.

According to another aspect of the invention, the couplers whose automatic devices are in the working state carry out a second count which also changes at the rate of the ends of channel phase and depending on the presence or absence of collision during each channel phase, but within the period and with forced and reference values of which at least one is different from those of the first count.

For the implementation of this process, the invention uses couplers including, in a known way:

a transmission channel test circuit, capable of providing at least three logic signals respectively representing a transmission in progress by the coupler (TxD), a reception in progress on the channel (RxD) and a collision detected on the channel (CD) and, a control circuit which provides the link between the rest of the station and the test circuit, depending on signals received on the channel and message transmit requests coming from the station.

In a coupler according to the invention, the control circuit includes:

means capable of storing at least one binary index that belongs to it, and at least one message transmit request relating to that index, channel phase logic means to define the ends of channel slots, as well as ends of channel phases corresponding either to an end of channel slot in which silence or a collision occurred, or to the end of the successful transmission of a message, first means for counting progressing at the rate of the ends of channel phases up to a chosen reference value, multi-state logic means, defining an automatic device having a rest state and a working state, called a period, in which it produces a predetermined sequence of index subsets, structured in order to be able to result in successive choices of just one of the indices, and to be able to thus cover the complete set of indices, the said sequence including a maximum number of steps which depends on its structure and on the total number of indices, means only authorizing the coupler to freely transmit if the first count is at its reference value, means capable of reacting to the presence of a collision when the first count is at its reference value by setting that first count to a chosen forced value, and putting the automatic device into its working state, or period, and means only then authorizing the coupler to transmit if its index belongs to the subset designated each time by the automatic device, the forced value and the reference value being chosen such that the count only returns to the reference value after the complete resolution of the collision that cuased the period, the couplers then being again authorized to freely transmit, while the automatic devices return to their rest state.

The coupler preferably contains second means for counting, also progressing at the rate of the ends of channel phases, and depending on the presence or absence of collisions during each channel phase, but within the period, and with forced and reference values of which at least one is different from those of the first means of counting.

Other aspects of the invention will now be described. They apply as much to the process as to the device. The general mode will be considered first, followed by the periodic mode.

In the general mode, the multi-state logic means are arranged in order to define a predetermined sequence structured as a binary decision tree, capable of subdividing the set of indices in successive dichotomies until they are obtained one by one, and with which is associated a scan/decision rule depending on the fact that the previous channel phase gave rise to a silence, a collision, or the successful transmission of a message, and the forced and reference values of the first count are spaced by 2 steps, this count progressing by one step, in incrementation or decrementation with respect to the reference value, depending on whether or not a collision occurred in the previous channel phase.

According to another aspect of this general mode, the multi-state logic means are arranged in order to execute a scan/decision rule which comprises:

the passage to the other sub-set of the dichotomy in progress, in the presence of a channel phase of silence, of a channel phase of successful transmission, or a new dichotomy of the sub-set in the process of examination, and, in the presence of a channel phase of collision, the forced and reference values of the second count are the same, this count progressing by one step like the first, in incrementation or decrementation with respect to its own reference value, so that this second count enables a coupler to determine that it has reintegrated a subset authorizing it to transmit.

According to an advantageous variant, in the presence of a channel phase of silence, the scan/decision rule includes a new immediate dichotomy of the other sub-set of the dichotomy in progress.

According to another advantageous variant, in the presence of a collision during which its first count is at the reference value, the coupler systematically puts its automatic device into the working state; in the rest of the period, the transmission of a message by the coupler remains authorized for indices belonging to a sub-set having given rise to a collision not yet resolved.

In practice, the multi-state logic means are arranged such that the said binary tree is defined according to the successive bits of the indices, and the order in which they occur.

According to a particular embodiment, the multi-state logic means include means forming a shift register of capacity at least equal to the maximum number of significant bits present in the indices of the predetermined set, the dichotomy comprising a shift of the content of this register, and means for comparing the content of the register with the current index.

According to another aspect of the invention, the coupler initially receives several indices of different priority, the said scan/decision rule scans the sub-sets of indices in the order of priority, and the message transmit requests are each associated with one of the indices according to their priority.

Accoridng to yet another advantageous embodiment, if no message transmit request has been received from its station, the coupler behaves as though it wishes to transmit a 'nil' message (the transmission will not be executed, unless in the meantime a true message has been substituted for the 'nil' message). The coupler thus systematically puts its automatic device into the working or period state, since a collision occurs during the rest state of that same automatic device.

In periodic mode, the said predetermined sequence is a series of all the indices, taken one by one, and the difference between the forced and reference values of the first count is at least equal to the number of steps in the said series, this count progressing towards the reference value at each end of channel phase without collision.

Very advantageously, this coupler has allocated thereto several indices, which enable the coupler to pass at least one other message with another index within the same period.

According to a particular embodiment, at least one of the first and second means for counting includes a shift register.

According to another aspect of the invention, for its entry into service, the first count of the coupler is set to a value at least equal to the maximum number of steps in the predetermined sequence.

Thus the communications network can be switched between general mode operation and periodic mode operation.

The invention also covers the network formed from several couplers such as defined above, connected to a common distribution transmission network.

Other characteristics and advantages of the invention will appear on examining the following detailed description and the appended drawing.

BRIEF DESCRIPTION OF THE DRAWING

FIG. 4 is a more detailed diagram of the circuit of FIG. 3;

SPECIFIC DESCRIPTION

The appended drawings include numerous elements of certain character that only they can contribute. They are therefore an integral part of the description in order to explain as well as to define the invention.

Also incorporated in the present description are the known elements relating to the CSMA-CD and/or Ethernet networks, in particular the already mentioned Patent, articles and standard.

Figure 1:
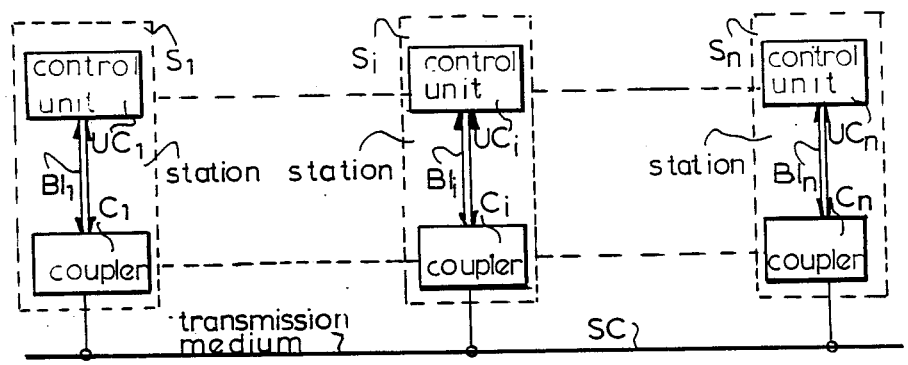
FIG. 1 is a general diagram of a communications network.

FIG. 1 shows a number of stations $S_1, \ldots S_i, \ldots S_n$. To each of them are connected one or more automated devices such as sensors/activators, programmable robots, controllers-regulators, data processing terminals, computers, telephonic equipments, or even video terminals, which may be referred to herein as the active equipment.

Each station $S_i$ is physically connected to a transmission medium or channel SC, by means of an equipment or hardware and software assembly called a coupler and referenced $C_i$. The station $S_i$ also includes a control unit $UC_i$, connected to the coupler $C_i$ by an internal bus $BI_i$.

In certain cases, it is also possible to incorporate the coupler in the active equipment.

As for the transmission channel SC, this is a distribution medium which can be electromagnetic or optical, passive, semi-passive or active (i.e. provided with amplifier-regenerators). It includes at least one transmission line, remembering that several lines are often used to provide security by redundancy of media and/or transmission-reception equipments and/or transmitted data.

Figure 2:
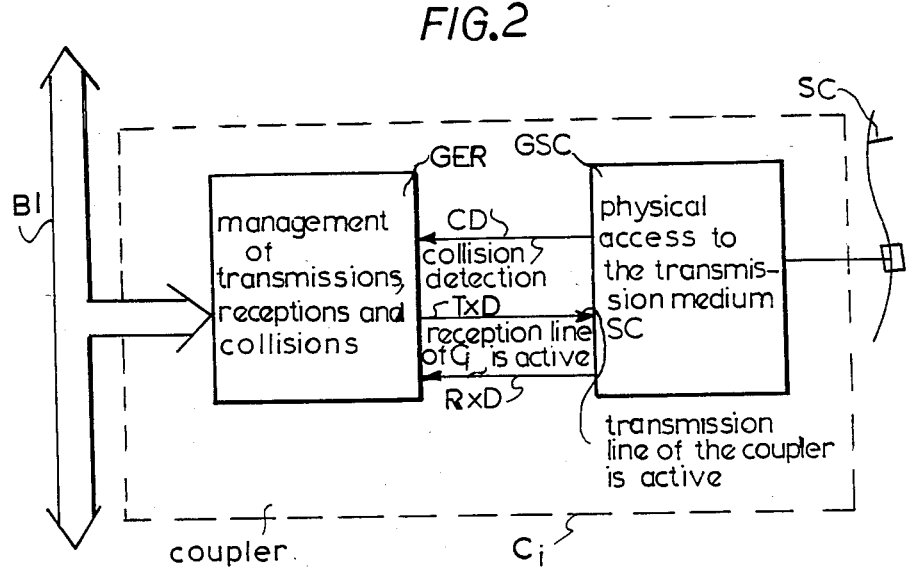
FIG. 2 is a block diagram of a coupler.

FIG. 2 shows, by way of example, an embodiment of a coupler $C_i$ (the index i is omitted in the following text). This coupler is composed mainly of a circuit GSC, which mangages the physical access to the transmission medium SC, and of a circuit GER, which carries out the management of transmissions, receptions and collisions.

Circuit GSC can be produced, in a known way, using integrated circuit units such as model 82 501 of the INTEL CORPORATION of the UNITED STATES OF AMERICA, or using discrete components. This circuit must provide at least three logic signals and their complements:

CD representing a collision detection and its complement $\overline{CD}$,

TxD indicating that the transmission line of the coupler is active, and its complement $\overline{TxD}$, RxD, indicating that the reception line of the coupler is active, and its complement $\overline{\text{RxD}}$.

The status of TxD and $\overline{\text{TxD}}$ is entirely under the control of the coupler concerned, whereas those of RxD and CD and their complements depend on other couplers.

If a single one of the couplers transmits, RxD then becomes true in all the couplers, after a time no later than p (p being the signal propagation delay from one end to the other of the communications medium, as defined above).

If two or more couplers detect the $\overline{\text{RxD}}$ status and decide to transmit, then the CD state becomes true for all the couplers within a maximum time of 2.p.

The fact that a message is being transmitted without collision is represented by the following condition:
$\overline{\text{CD}}$ & RxD
the & symbol representing the logic operator AND.

Finally, RxD is always true when CD is true, since if there is a collision, a reception (probably incoherent or disturbed) is necessarily in progress.

The above presumes a time division. In the CSMA-CD technique, this time division is carried out asynchronously at the level of each coupler according to transitions and channel slots (TC). For the implementation of the invention, this division is carried out according to "channel phases". A channel phase is:
either the time interval corresponding to a complete and successful transmission of a message (condition $\overline{\text{CD}}$ and RxD; variable duration),
or the time interval of duration equal to a channel slot during which a collision appears together with the corresponding interferences (conditions CD and RxD),
or a time interval of duration equal to the channel slot, during which this channel is silent, with neither transmission nor collision ($\overline{\text{CD}}$ and $\overline{\text{RxD}}$).

Figure 3:
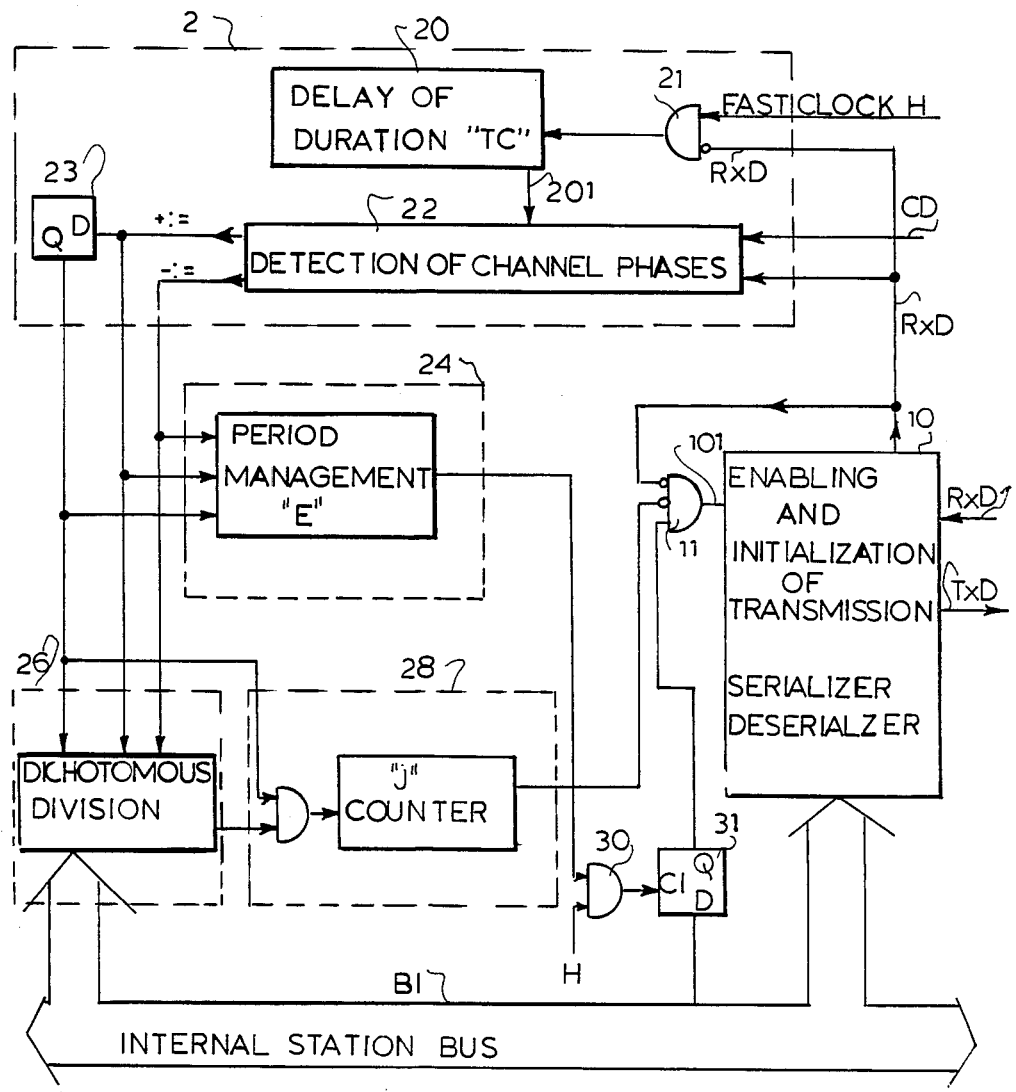
FIG. 3 is a partially detailed diagram of a circuit of the coupler in FIG. 2.
Figure 4A:
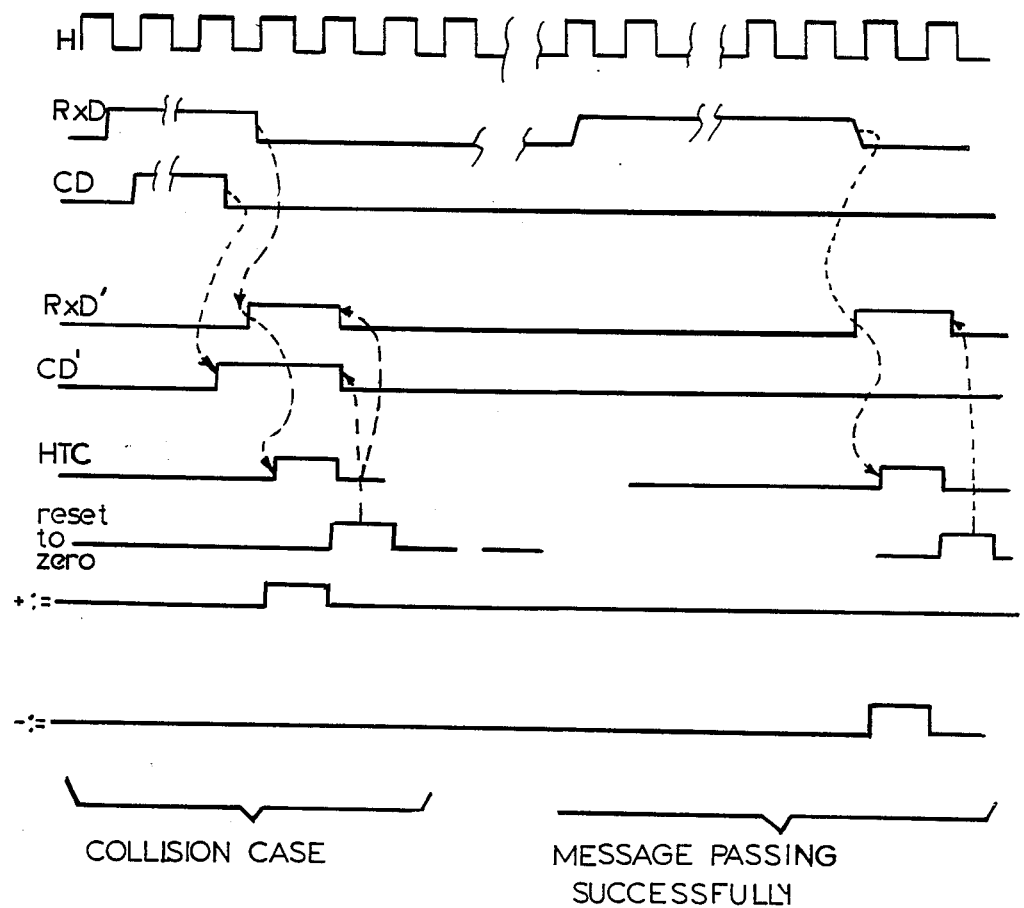
FIGS. 4A and 4B are timing diagrams relating to the circuit in FIGS. 3 and 4.
Figure 4B:
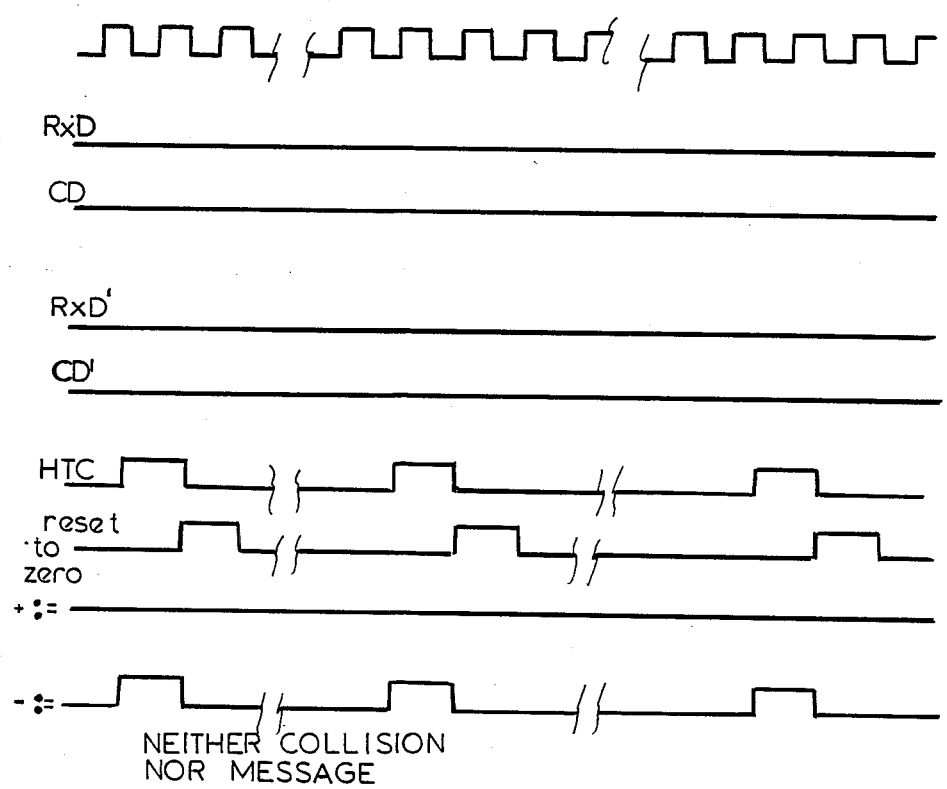
Figure 5:
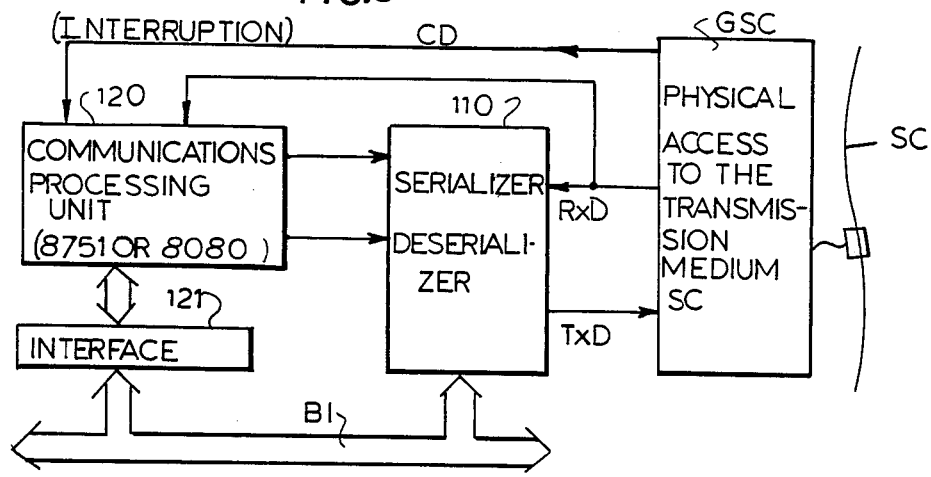
FIG. 5 is a diagram of a variant embodiment of the circuit of FIG. 2.

This time division is carried out in circuit GER (FIG. 2) of which a mainly hardware embodiment is shown in FIGS. 3 and 4, while FIG. 5 and the following Figures show preferred variant embodiments of this same circuit.

HARDWARE EMBODIMENT

At the bottom of FIGS. 3 and 4 we recognize the internal bus BI, and on the right we see the three signals CD, RxD and TxD exchanged between the already mentioned circuits GER and GSC.

In the presence of a transmit request by the station, and of the corresponding digital message to be transmitted, the internal bus BI applies this message to a circuit 10 called a serializer/deserializer. It is produced for example using an integrated circuit type 2652 sold in France by the RTC Company.

For the transmission, the function of circuit 10 is to seralize the message given to it in parallel by the internal bus BI adding to it a header and/or synchronisation bits. This message is then conveyed by signal TxD. Conversely, for a reception without interference, circuit 10 will restore the parallel format of the information coming to it in series, through the transmission channel, from another coupler. The header and the synchronization bits are then eliminated. Signals RxD and TxD are therefore directly exchanged between circuit 10 and circuit GSC in FIG. 2. Circuit 10 however reproduces signal RxD, now in logical form, so that it can be used by the elements accompanying it. Circuit 10 also has a logic input 101, connected to the output of a logic gate 11. This input 101 enables the validation and initialisation of transmission, in the presence of a request to transmit a digital message by the local station.

A clock circuit (not shown) provides a fast clock signal H to one input of an AND gate 21. The other input of gate 21, which is inverting, receives the logic signal RxD supplied by circuit 10. The output of this AND gate 21 is applied to a counter-timer 20, capable of producing a delay of duration TC, i.e. the channel slot. It is verified that the channel slot is defined asynchronously in each of the couplers from its own fast clock H.

At the end of the delay, an output 201 of circuit 20 starts the operation of circuit 22 for the detection of the "channel phases". Circuit 22 receives the signals CD and RxD and other signals. It has two outputs $+:=$ and $-:=$. By convention, $+:=$ is associated with a shift to the right in a shift register, while $-:=$ is associated with a shift to the left.

The signal $+:=$ is stored in a flip-flop 23. The output of this flip-flop 23, referenced $+:='$, as well as the two output signals of circuit 22 are applied on the one hand to a circuit 24 for the management of periods E, and on the other hand to a circuit 26 capable of producing a dichotomous division. Circuit 26 can also receive the internal bus BI.

The output of circuit 26, as well as that of flip-flop 23, are applied to a circuit 28, which forms a second counter for the implementation of the invention.

Finally, the output of circuit 24 is applied, at the same time as the fast clock signal H, to an AND gate 30. The output from this gate operates a flip-flop 31, which here receives a wire coming from the internal bus and, with its own output, controls the already mentioned AND gate 11.

Reference is now made to FIG. 4 which shows a particular embodiment of the units in FIG. 3.

A flip-flop 225 receives the logic signal RxD as a clock signal. On its input D it receives a logical '1' signal, +5 volts in this case. Its output Q therefore returns to the logical '1' level at the end of the first pulse appearing in the signal RxD. The output signal Q of flip-flop 225, referenced RxD', is complemented and applied to a load control input of circuit 20, which is a shift register in this case. On activating this input, the shift register 20 receives a logical '0' signal in all its stages except one, which receives a logical '1' signal. It is then pulsed by its signal input SL, by means of the output signal from AND gate 21, which is formed of fast clock pulses H, limited to the duration of the complemented RxD signal. The "channel slots" are therefore only produced in the absence of reception in progress. Output HTC of circuit 20 is immediately excited for a duration equal to one fast clock cycle. It will again be excited, in the absence of signal RxD, after a number of fast clock pulses corresponding to the required delay TC. This output is applied first to the D input of another memory flip-flop 228, the clock input of which receives the fast clock H. The Q output of this flip-flop 228, immediately after the first fast clock pulse following the appearance of the HTC signal, produces a reset to zero pulse applied to the input R of flip-flop 225. The latter is then ready to take a new RxD signal into account.

Output Q of flip-flop 228 also produces a reset to zero of another flip-flop 229, the D input of which receives a logical '1' signal, and of which the clock input is the signal CD.

The Q output of flip-flop 229 provides a collision detection signal referenced CD', which is therefore refreshed in this way after each channel slot, as measured by the timing circuit 20.

The signal +:= is now provided by an AND gate 221 which receives on the one hand the signal HTC and on the other hand the signal CD'. The signal —:= is provided by an AND gate 222. One input of this gate is provided by an OR gate 223 which receives on the one hand the signal HTC and on the other hand the signal RxD'. The other input of AND gate 222, a complemented input, receives the signal CD'.

Flip-flop 23 receives the signal +:= on its D input. It receives the fast clock signal H as a clock. It will therefore take the +:= signal into account at the first fast clock pulse H which follows it, which provides a signal +:=' which is delayed by one clock cycle with respect to signal +:=.

The first function of the circuit which has just been described is to establish the detection of channel phases, a channel phase being:
a collision appearing during a time interval of duration equal to the channel slot, or
a message passing successfully during a time interval that varies with the duration of the message, or
a channel slot during which neither collision nor message occurs.

The left hand side of FIG. 4A applies to the case of a collision. The rising of signal RxD indicates that a message or messages are in transit on the transmission channel. The rising of signa CD signifies that there is a collision and that there are therefore several messages. Signals RxD' and CD' go to the true state at the falling edges of signals RxD and CD respectively. The rising edge of signal RxD' enables the loading of the content of the shift register which then produces the signal HTC at the end of the next pulse of the fast clock H. By means of flip-flop 228, the falling of pulse HTC returns the RxD' and CD' signals to the 0 state. Meanwhile, the HTC pulse has produced a +:= signal on the output of AND gate 221.

It is noted that the timer 20 is inhibited as soon as signal RxD is active because of AND gate 21. A specialist in the field will also have understood that the flip-flops and registers are loaded on the rising edge of the clock pulse applied to them while their output becomes valid on the falling edge of the clock, i.e. that their output signal is only provided on the falling edge following the rising edge of the clock.

The right hand side of FIG. 4A shows a message passing successfully. This time, no signal CD has appeared during the signal RxD. RxD' is produced as before, followed by HTC after one clock pulse. The reset to zero applied only to the signal RxD' since the signal CD' did not go to its true state in the absence of any CD signal. In this case, it is the AND gate 222 which provides a signal —:= during the HTC pulse.

FIG. 4B shows the case in which neither collision nor message appears. In this situation, shift register 20 is looped back on itself. Its single bit at '1' appears periodically at its output 201 in order to produce the signal HTC. This is immediately followed by a reset to zero pulse which however has no effect on flip-flop 225 and 229. As it is the $\overline{CD}$ condition that is true, we note that AND gate 222 provides a signal —:=. This situation is repeated three times in FIG. 4B, thus showing three consecutive channel slots with neither collision nor message.

The circuit in FIG. 4 is capable of operating in two different modes, which must be selected in conjunction in all the couplers working on the same communications medium.

The mode is defined by a mode bit which takes:
the value '0' for the general mode, corresponding to a dichotomous sequence,
the value '1' for the periodic mode, which corresponds to a sequence in which the indices are examined one by one.

In this embodiment, circuit 24 includes a unit 241 which receives the mode bit. Unit 241 is a demultiplexer enabling the presetting of the inputs of a shift register 240 (in two blocks of k+1 inputs on the one hand, n−k−2 inputs on the other hand) depending on whether the mode bit is at 0 or 1. Now, n designates the number of couplers potentially connectable to the channel, and n is codable in k bits, k being the next highest integer approximation of $\log_2 n$, where $\log_2$ indicates a logarithm to the base 2 function.

It is now appropriate to note that the general mode can be subdivided into two cases, one called blocked inputs (EB), the other called free inputs (EL). In the blocked inputs mode, a switch 305 directly transmits the signal from output 242 to a complemented input of gate 30. In the free inputs mode, it is the Q output of flip-flop 306 which is transmitted. It is recalled that the second input of gate 30 receives the clock signal H. Its output defines the clock of flip-flop 31, the D input of which receives one of the wires from the internal bus BI, which corresponds to a message transmit request. When output 242 of register 240 indicates that the register is at zero, output Q of flip-flop 31 produces a signal DT which will be used to enable and initialize the transmission, by its action on one of the inputs of AND gate 11. This only effectively authorizes transmission if on the one hand there is no reception in progress (signal $\overline{RxD}$ true), and on the other hand if the register 280 which is included in unit 28 has an output 281 in a predetermined state, representing a 0 value as will be seen later. The 1 state of output 281 corresponds with a losing coupler after a dichotomy.

The same output 281 is taken into account at the clock input of a flip-flop 306, which then goes to the true state, and its Q output can, in the "free inputs" condition, be taken into account in the corresponding state of switch 305 for feeding the already mentioned AND gate 30.

Finally, the same output 281 is applied to a complemented input of an AND gate 261, which receives as another input the +:= signal coming from AND gate 221, as well as the signal DT provided by the Q output of flip-flop 31.

The output of AND gate 261 is applied to a dichotomy register, referenced 260, at its shift right input SR. This shift register 260 contains an index x. It receives the fast clock H as a clock signal. It receives the output of an AND gate 265 as a load command. A first, complemented input of this gate is the signal coming from output 242 of the period management register 240. A second input of gate 265 is the free inputs signal coming from the Q output of flip-flop 306. A third input of AND gate 265 is provided by an OR gate 266. This receives on the one hand the selection wire which is also applied to flip-flop 31. On the other hand it receives the output of a type 74 121 delay circuit (monostable) which has the signal 242 of the period management register 240 as its input.

Finally, the output of circuit 74 121 is also applied to a set of AND gates 270, which receive as other inputs the outputs of a circuit 290.

Circuit 290 can be loaded from the internal bus BI, by a value x' which it then transmits to the already mentioned gates 270 as well as to circuit 280. This value x' defines one or more other indices usable in the period.

As for shift register 260, its least significant bit output, referenced LSB, enables an AND gate 275 whose other input is the +:=' signal. The output of this gate 275 is received by a demultiplexer 282, controlled by the mode signal.

This means that shift register 280, which defines a value j in n bit, receives on its shift left input the −:= signal coming from AND gate 222. It receives a signal derived from +:=' and from the least significant bit of register 260, and it receives this either on its shift right input SR, or on its load input depending on the state of the mode bit applied to demultiplexer 282. Like the others, the shift register 280 is supplied with the fast clock H.

The flip-flop 306 receives on its D input a "1" signal referenced +5 V. On its clock input it receives the signal present on line 281, which corresponds with the bit that is furthest to the left in register 280. A specialist in the field will understand that, when this circuit is shifted to the right for the first time, signal 281 goes from "0" to "1". Subsequently, and depending on the successive shifts of this register (to the left or to the right), this signal will return to "0" (after a sufficient number of left shifts). Therefore the clock input of flip-flop 306 will have seen a complete pulse and its output goes to "1". In free inputs mode, it supplies the complemented input of gate 30 and therefore prohibits the taking into account of a subsequent transmit request. The fact that signal 281 goes from "1" to "0", means that the coupler again has the right to transmit. Transmission for this coupler is therefore prohibited when it has once had the right to transmit after the initial collision. The transmit prohibition is removed when signal 242 returns to 0, i.e. when the period is complete. This is achieved by the fact that the complemented signal 242 is applied to the R (reset to zero) input of flip-flop 306.

The operation of these elements of FIGS. 3 and 4 will be described later in functional form and in a way that is common with the other embodiments of the present invention.

These other embodiments use a hardware architecture which is shown in FIG. 5. We again find circuit GSC in direct connection with the transmission channel SC. As before, this circuit provides the signals CD, RxD, TxD and their complements. The signal RxD is applied to a serializer/deserializer 110, which also receives the internal bus and produces the serial signal TxD. A processing unit for the communication is formed from a circuit 120, which can be based on an INTEL Corporation 8751 or 8080 microprocessor. This unit 120 is provided with an interface 121 which enables it to exchange data with the internal bus BI. The processing unit receives, in the form of interrupt instructions, the signals CD and RxD produced by circuit GSC.

The functioning required of the processing unit 120 will be described hereafter by Petri network diagrams, in which however are incorporated tests comparable with those of traditional flowchart representations.

PERIOD COUNTER OR E COUNTER (FIG. 6).

Figure 6:
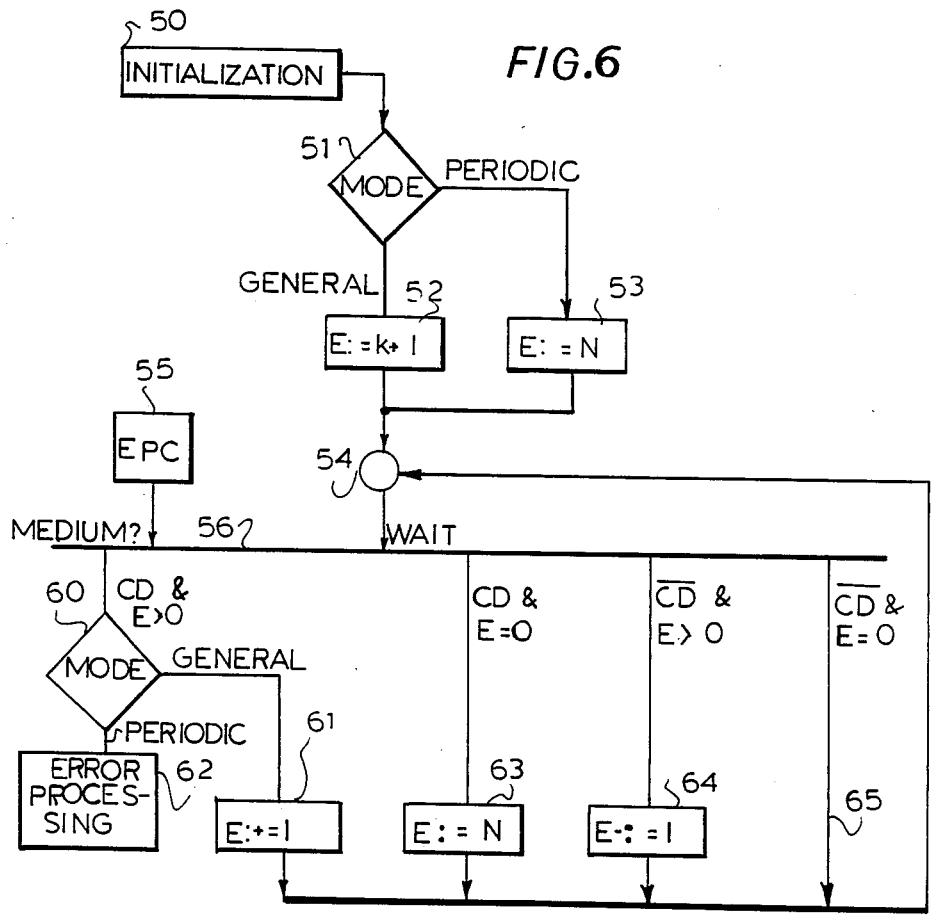
FIG. 6 is a diagram illustrating the operation of the "period counter"

The starting point in the diagram of FIG. 6 is the initialization of a coupler (block 50). The initialization starts with a mode test 51, the mode being defined by a bit which is set to '0' (general mode) or '1' (periodic mode) when the couplers are manufactured or even when installed on site. In general mode, the output of test 51 is a stage 52 consisting in forcing a counter E to a value k+1. (The symbol := illustrates the allocation of a digital value to a variable.) In periodic mode, the output of test 51 will, in stage 53, allocate the value N to counter E. It will be seen later that N equals n in periodic mode and 2 in general mode.

Then a "place", as known in Petri networks, appears in 54. The thick horizontal line 56 represents the interrogation of the transmission medium. Another place 55, marked FPC, also comes on this line 56 for "end of channel phase". It is only when the two places 54 and 55 each have their check that the interrogation of the medium at line 56 can be executed. (This corresponds with block 2 in FIG. 3.)

It is recalled that counter E is here at zero in the rest state of the automatic device according to the invention. It will go to positive whole values when the automatic device is in its working state, while retaining a predetermined relationship with the sequence of index sub-sets produced by the automatic device. Four situations can occur:

CD and E positive. A test 60 again examines the bit mode. In general mode, an incrementation by one step at stage 61 is carried out in counter E. In periodic mode the situation is abnormal. A stage 62 carries out an appropriate error processing to enable the communications network to start operating again.

CD and E=0. Stage 63 allocates the value N to counter E, remembering that N equals 2 in general mode and n in periodic mode.

$\overline{CD}$ and E positive. Stage 64 carries out a decrementation by one step of counter E, whatever the mode.

$\overline{CD}$ and E=0. We return directly to place 54.

Figure 7A:
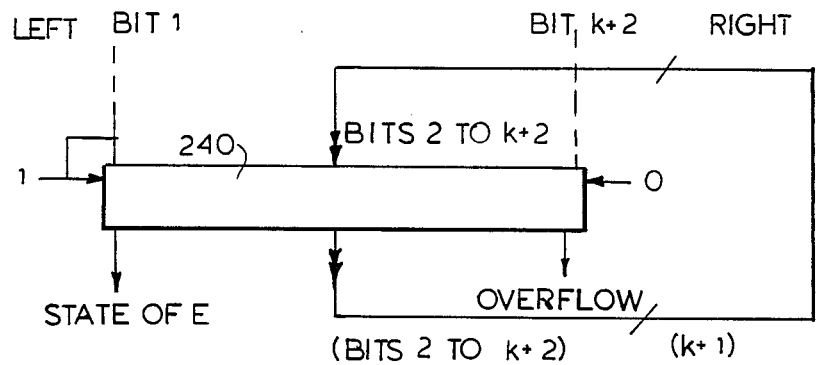
FIGS. 7A to 7C are diagrams of three embodiments of the period counter.
Figure 7B:
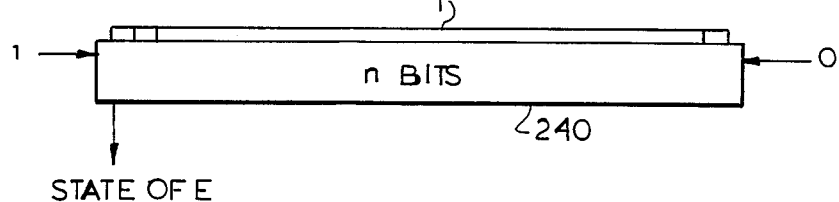
Figure 7C:
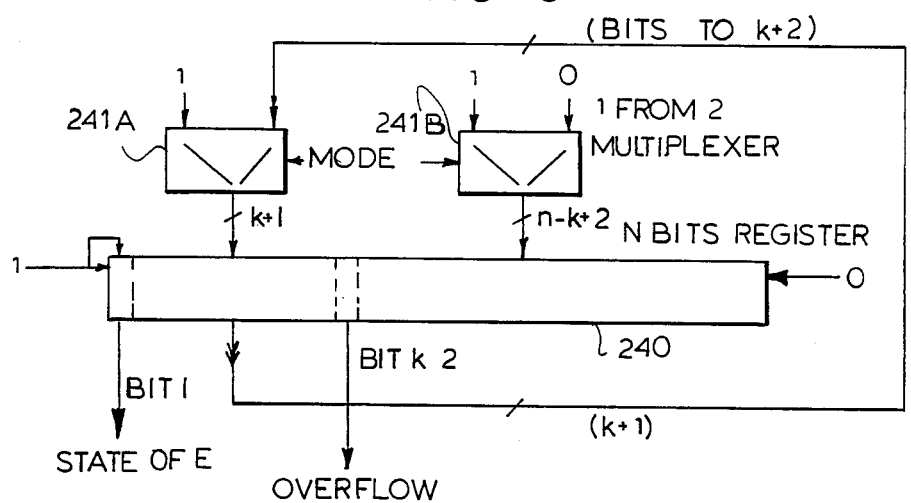

The diagram of FIG. 6 and the configuration of circuit 24 which corresponds with it in FIGS. 3 and 4 will be better understood on examination of the detailed diagrams in FIGS. 7A to 7C.

We now accept that the counting of the value E is carried out by a shift register having at least k+1 bits (preferably k+2) for the general mode and n bits for the periodic mode. We shall however speak of "counter E".

In general mode (FIG. 7A), all the bits of shift register 240 are initially set to 1. A 1 value is presented at the left, such that, during a shift to the right, a 1 value is inserted in the bit in the first position of register 240. Conversely, a 0 value is presented at the right, such that, in the case of a shift to the left, a 0 value is introduced into the position of bit k+2 which is the furthest to the right.

Bits 2 to k+2 of shift register 240 are also looped back on themselves, i.e. they can be copies identically if necessary. Thus, on each collision bits 2 to k+2 of the register are reloaded on themselves, while the first bit (bit 1) is loaded with 1, then there is a shift to the right. This also produces the initial forcing, without making any difference between the first collision and the following collisions.

The output of counter E is the state of its first bit, as shown in FIG. 7A (equivalent to signal 242 in FIG. 4).

FIG. 7B relates to the case of the periodic mode. The shift register 240 now contains n bits. All can be set to 1 simultaneously on an external load command. During a shift to the right, a 1 value is presented at the left, while, during shifts to the left, a 0 value is presented at the right. Here again, the output of counter E is defined by the state of its first bit.

FIG. 7C shows a combined embodiment, enabling the functions of FIGS. 7A and 7B to be produced from the same register. A multiplexing (the function of circuit 241, FIG. 4) is produced by units 241A and 241B. They are 1 from 2 multiplexers. For the general mode, the mode bit equals 0. Multiplexer 241A recycles bit 2 to $k+2$ of the register identically, while multiplexer 241B introduces 0's into the $n-k-2$ other bits. On the contrary, in periodic mode, multiplexer 241A introduces 1's into bits 2 to $k+2$, while multiplexer 241B introduces 1's into the $n-k-2$ other bits. A specialist in the field will understand that the circuit thus obtained is capable, depending on the status of the mode bit, of providing at choice either the functioning of FIG. 7A, or that of FIG. 7B.

The functining of the devices according to the invention in both the general mode and the periodic mode will now be described briefly.

GENERAL MODE

We have observed that the maximum number of successive collisions that can occur within a period in general mode is $k-1$, using the convention that the initial collision starting a period is not counted. We have also observed that, in general mode, the maximum number of consecutive empty slots within a period is $k-1$ if we assume totally reliable couplers or $k+1$ if it is desired to tolerate faults.

That is why, in FIGS. 7A and 7C, counter E is set to the initial value $k+1$ in the couplers on initialization. A specialist in this field will understand that the fact that on initialization the coupler is not synchonized with the other couplers on the empty slots (presuming that a period is in progress) is of no importance as either this synchronization is of no use since counter E reaches the value 0, or the necessary synchronization is normally obtained in the case of a channel becoming active before E reaches the value 0.

On initialization, stage 52 (FIG. 6) forces E to $k+1$. A check is put in place 54, and normal functioning begins. Similar functions (not shown) are executed in the device of FIGS. 3 and 4.

The detailed analysis of the various possible cases verifies that counter E of a coupler on initialization reaches the value 0 within a finite time, with an upper limit, and that this value 0 is never reached while a period is in progress. Bit $k+2$ enables erratic functioning of a coupler to be detected.

PERIODIC MODE

In the absence of errors, it is only at the start of a period that a collision can occur, which will enable a coupler on initialization to synchronize itself with the operating couplers. In the case of a collision, each coupler assigns its E counter with the value $N=n$, which is also the initialization value.

If E reaches the value 0 without any collisions occurring, this indicates that the coupler is the only one in the system.

The system can therefore be initialized by initializing one or more couplers simultaneously.

When the couplers are initialized, the periods are supervised according to the mechanism shown in FIG. 6.

This mechanism is continuously executed by all the couplers. It can be hard wired as in the case of FIGS. 3, 4 and 7 or microprogrammed from the hardware in FIG. 5 and a software conforming with the diagrams shown in the following Figures.

In an operating coupler, the current value of E can be interpreted as indicating the number of channel phases to be inspected before the end of the period in progress.

The condition $\overline{CD}$ and E equals 0 indicates that there are no periods in progress. As long as no collisions appear, the counter E does not change.

The condition CD and E equals 0 results, as soon as the CD line goes true thus indicating the presence of a collision, in the counter E taking the value N, which is either 2 in general mode or n in periodic mode.

Condition $\overline{CD}$ and E positive. When a message is passing or when the medium remains free during a channel slot within a period, then counter E is decremented. A return to the monitoring of the medium only occurs after the complete reception of the message, or after having detected the end of an empty channel slot.

Condition CD and E positive. When there is again a collision within a period, then E is incremented if we are in general mode. In periodic mode, this case must not occur. Stage 62 therefore calls upon an error processing capable of restoring the correct operation of the network.

Figure 8:
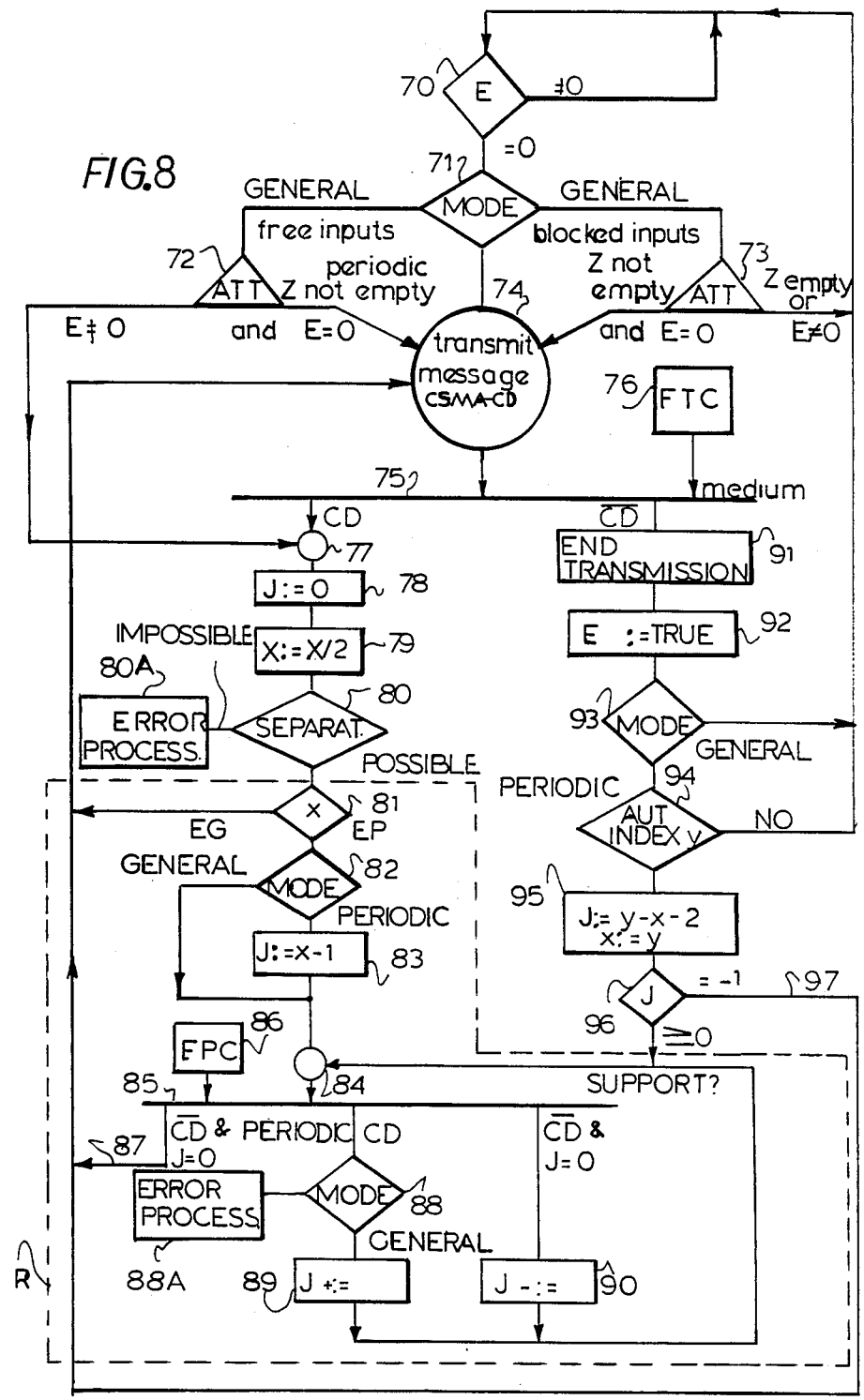
FIG. 8 is a diagram showing the operation of a device according to the invention.

We will now consider, with reference to FIG. 8, the actual management of message transmission.

It is recalled that the proposed process can operate in two modes: general and periodic. The mode is selected when the couplers are manufactured or when they are installed. In general mode, each coupler has the choice of operating with blocked inputs or with free inputs. In a coupler with blocked inputs, no new message, apart from the messages actually in collision, will be able to be transmitted during a period. On the contrary, in a coupler with free inputs, a coupler not having submitted a message at the time of the collision starting a period can, provided that it keeps to conditions aimed at not disturbing the operation of the other couplers, transmit a newly arrived message within the period.

The submission of a message by the station to the coupler is carried out in all cases by activating a primitive that can be written Submission (m, index, F), the execution of which leads to the storage in a known memory area Z of the transmission management circuit GER, of the following data:

the message itself m, the associated index, a Boolean F which will indicate that the message has been successfully transmitted by the coupler on the medium when it goes to the true state.

It will be noted that, in general mode with blocked inputs, a coupler is only active within a period if it has actually attempted to transmit a message at the start of the period (with collision). On the other hand, in general mode with free inputs as well as in periodic mode, the process enables a coupler to become active within a period even if no message was submitted to that coupler at the start of the period.

In general mode with free inputs, as well as in periodic mode, when no message has been submitted, the coupler will transmit a "nil" message corresponding with a silence.

The execution of the Submission primitives, that a specialist in the field knows how to achieve, is independent from and asynchronous with the execution of the transmission management protocol. This protocol is permanent and will now be described.

The following locations in the memory area Z are used:
message := m or "nil",
x := index (the index being fixed in advance if the message is "nil"),
end := F.

The first test 70 constitutes a wait while the counter E reaches its 0 value. We assume that a period has just ended, which therefore corresponds with such a passage of E to 0. The next test 71 examines the mode used.

The transmission (of CSMA-CD type) of a message is illustrated in place 74. Such a transmission is still attempted in periodic mode as well as in general mode if a message has been submitted (passage through waiting phases 72 and 73, but without waiting, since E is at 0 by hypothesis).

Line 75 illustrates the monitoring of the medium, which responds to the two conditions that checks have been put in places 74 and 76 (end of channel slot).

In periodic mode, we are certain to cause a collision CD and therefore a start of period, except in the case where a single coupler wishes to transmit.

The general mode and the periodic mode will now be described separately using FIG. 8.

GENERAL MODE

In general mode, a collision can occur but it is also possible that the transmission may take place normally ($\overline{CD}$). In this last case, stage 91 terminates the transmission, which is of a duration equal to at least the channel slot. Stage 92 sets the end Boolean F to the true state. Stage 93 examines if the mode in progress is the general mode, in which case it returns to test 70. And test 71 again makes the distinction between the two variants, "blocked inputs" and "free inputs" of the general mode.

It is now appropriate to return to the observation of the medium (line 75), in order to examine the other hypothesis in which a collision occurs. A check is therefore put in place 77.

Then, stage 78 allocates the value 0 to the term j, and stage 79 executes one step of the dichotomous division which is expressed X: =X/2.

A test 80 establishes whether this dichotomous separation is possible or impossible. Impossibility signifies an error, processed by calling up an appropriate procedure (stage 80A).

If the separation is possible, we move on to test 81 which determines if the index in progress x belongs to the winning sub-set G or to the losing sub-set P. If it belongs to the winning sub-set, a new attempt at the transmission of the message occurs in place 74. If the index x in progress belongs to the losing sub-set, the continuation depends on a new test 82, concerned with the fact that we are in general mode or in periodic mode. In general mode, we jump directly to place 84. The output of place 84 is again the observation of the medium 85, this time with the condition that we no longer observe the medium at the end of a channel slot but at the end of a channel phase (FPC in place 86).

If there are no collisions and if j is zero, line 87 returns to the transmission place 74 (all previous collisions having been resolved).

If there is a collision, a new mode test takes place at 88. In general mode, stage 89 modifies j by incrementing by one step.

If there are no collisions, but the term j is not zero, stage 90 decrements j by one step.

The outputs of the two stages 89 and 90 return to place 84 (collision not yet resolved).

Elements numbered 81 to 90 of FIG. 8 are enclosed by a light broken line reference R, in order to indicate that these are the elements that actually deal with collision resolution.

The right hand output of the waiting phase 73 recalls that in general mode with blocked inputs, transmission is prohibited if a period is in progress (E other than 0) when a message has been submitted.

The left hand output of the waiting phase 72 recalls that in general mode with free inputs, the coupler executes the transmission management mechanism at the start of a period, i.e. as soon as E becomes other than 0. It therefore goes to place 77, preparing the transmission of a message. If the memory area Z only contains the "nil" message at the time at which it is authorised to transmit, there will be no actual transmission, this coupler remaining silent. In the opposite case it transmits its message.

It is appropriate to describe the dichotomous separation of the set of indices in a little more detail in order to isolate those corresponding with couplers having a message to transmit.

The set X as defined above represents the set of possible values of indices associated with the messages and with the couplers. x refers to the current value of the index used by an active coupler, i.e. participating in the period.

A coupler can have one or more indices. In the latter case, the indices are used by the coupler in the order of increasing value.

At the start of a period, the set of indices chosen by an active coupler is referenced $X_0$. We assume, for purposes of simplification, that this starting set of indices includes all the values from 0 to $2^k-1$.

The binary tree is run through choosing a right to left or a left to right scan, the right/left or left/right choice being the same for all the nodes, from the trunk ("top" of the tree) to the leaves ("bottom" of the tree).

The set $X_0$ is therefore separated into two sub-sets, and it is done so in an identical way by all the active couplers. The direction of scan chosen determines a winning sub-set G and a losing sub-set P. Each coupler examines if its current index x is part of G.

If it is, the coupler again attempts to transmit the message. In the case of a new collision, the same procedure for the dichotomous separation of the set of indices G into two new sub-sets G and P is executed and so on until a message transmission without collisions is successful.

This is what is noted by the expression X: =X/2 on FIG. 8, at 79. It is also what is operated, at each shift (to the right), by register 260 (FIG. 4).

Each time a coupler discovers that its index x belongs to P, it abstains from transmitting, and monitors the medium (line 85). A local variable, referenced j, enables it to know at which time it will be authorised to again attempt the transmission of its message. We will return to this hereafter.

It is observed the the rule for separation into two sub-sets can be any whatsoever. For example G and P will correspond to even and odd indices respectively, or even for the whole of the start set $(0, 2^k-1)$, G will correspond to the indices of the set $(0, 2^{k-1}-1)$ and P to the indices of the set $(2^{k-1}, 2^k-1)$.

A specialist in this field will understand that the rule for computing the index must be chosen, based on priority classes, in such a way that when an index is produced, all the messages of highest priority are in the first winning sub-set, then those of immediately lower priority in the second winning sub-set during the second iteration and so on. We thus guarantee that the order of transmission of messages within a period respects the order of priority.

For example, in a system of static priority including several classes, the priority rating will be equal to the class or to a function of this class depending on the conventions used for numbering priorities. In a system of time priority (physical due times), the rating will be equal for example to the remaining time to run before the due time or to a function of this time according to the conventions used for numbering and arranging the priorities.

We will now examine the authorization to transmit again within a period, starting from variable j.

The initial value of the variable j is 0 in general mode. When there are no errors, the final value of j will be 0.

The different possible cases coming from line 85 can be expressed as follows:

collision detected CD: there is still a collision to be resolved; j is incremented (signal 281 at the 1 state, FIG. 4);

no collision $\overline{CD}$, which corresponds with a message or with an empty channel slot:

if j is other than 0, there is still at least one collision that is not totally resolved, j is therefore decremented by one step (j corresponds to the state of the signal 281)

if j=0, all previous collisions have been resolved, the coupler has the right to transmit again within the period.

The current value of j can be interpreted as indicating the number of channel phases remaining to be inspected, minus one, before the coupler can be authorised to transmit again.

In general mode, a coupler always calculates an index by concatenating a logic name (unique for that coupler in the system) with the position of the waiting message with the highest priority. In general mode with free inputs, if the coupler enters a period with a "nil" message, it calculates the index by concatenating its name with a position fixed in advance, the index not being changeable during a period (loading of x' in x at the end of a period, FIG. 4).

In a particular embodiment of the invention, the dichotomous separation is achieved by the fact that each coupler has a shift register of length k. In this register is written the index corresponding with the message to be transmitted.

To divide X into two sub-sets therefore amounts to shifting the bits in this register by one position to the right or to the left. Depending on the value of the bit that comes from the register at this time (value 0 or 1), an active coupler will know if it has won or lost. The choice of 0 or 1 to win or lose is free, on condition that it is identical for all the couplers. The shift operation is executed at each iteration. This embodiment is of course given by way of example as numerous equivalent embodiments can be envisaged.

In this example of an embodiment by means of a shift register, the rules enabling priorities to be taken into account are as follows:

if the register is shifted to the left, the indices are discriminated according to the parity of the most significant bits. For example any index having a bit 0 at the left will be winning with respect to an index having a bit 1 at the left. In this case, the priority rating forms the most significant section of the index. The rating values are equal to the static priorities or equal to the remaining time to elapse before the due time and the value 0 obviously then represents the highest priority rating value.

if on the other hand the register is shifted to the right, the indices are of course discriminated according to the parity of the least significant bit. Any index having a bit 0 at the right will be winning with respect to an index having a bit 1 at the right. In this case, the rating constitutes the least significant section of the index. The calculation of rating values from priorities or due times is the same as above. On the other hand, the rating values calculated are written inverted in the register, the most significant bit of the rating becoming the least significant bit of the rating and so on.

As for the j value counters, these are advantageously produced by means of a shift register of capacity at least equal to k useful bits in general mode. As has been seen previously, when the coupler loses, j is loaded with the value 0 in general mode.

In brief, counter E serves to determine the presence of a period and its duration. It operates in all the couplers in service. When a coupler is put into operation, its counter E is set to k+1 (FIG. 6), the maximum number of steps in the dichotomy (though faster and more sophisticated initialization of such a coupler can be envisaged).

As for the rest, two cases can occur in which the absence of messages to transmit is considered as a state of inaction of the coupler, or a request to transmit a "nil" message.

In the first case (inaction), only the active couplers execute the rest of the process (stages 74 to 93).

In the second case ("nil" message), or else in "free inputs" mode, all the couplers in service execute the rest of the process (stages 74 to 93).

PERIODIC MODE (FIG. 8)

The above general considerations are mostly valid in periodic mode. On the other hand, the index scanning sequence is fixed, and examines them one by one, in increasing order in this case.

If E=0 (end of period), we pass through place 74.

In the great majority of cases, two couplers at least will have genuine messages to be transmitted, hence a collision, and the immediate starting of a new period.

Condition CD therefore requires us to pass through stage 78 to arrive at 79. Stage 79 subdivides the set of indices into a winning sub-set, having a single element (the index 0) the other indices defining the losing sub-set. (If test 80 shows that the subdivision is impossible, an appropriate error processing 80A is carried out.)

Test 81 authorises the coupler having the index 0 to transmit immediately by returning to place 74. In the other couplers, stage 83 gives the value x−1 to the second count j and we go to place 84.

The coupler having the index x=1 now has j=0. Output 87 of line 85 returns it to place 74, to be transmitted in its turn in the next channel phase (check in place 86).

The other couplers pass through stage 90, which decrements j by one unit, and returns to place 84. Each in their turn will arrive at j=0 and thus obtain the right to transmit.

A collision during a period is abnormal. Test 88 therefore ensures that an error processing procedure 88A is called upon.

The couplers which have transmitted in their turn are on this occasion passed by stages 91 and 92.

Tests 93 and 94 enable them to make use of another index within the same period, if necessary, or the smallest of several indices that they still possess. The value y−x−2 is allocated to j and the value y is allocated to x.

Test 96 therefore returns the coupler to place 84 if j is positive or zero.

A specialist in this field will understand that if j=−1, the coupler must transmit immediately, and test 96 consequently returns it to place 74.

Exceptionally, it is possible that a single coupler truly wishes to transmit after the end of a period. In this case, a period is not started as the coupler passes directly from place 74 to stages 91 and 92.

It will be apparent to a specialist in the field that this periodic mode is totally different from time division multiple access (TDMA) transmission processes.

A specialist in the field will also understand that the periodic mode can be modified in order to examine the set of indices in disjoined sub-sets of two indices each.

More generally, other intermediate modes exist between the general mode and this modified periodic mode; the intermediate modes will be defined each time by a distribution of the set of indices, and by a scan rule associated with this division, if necesary.

After these explanations, it will be possible to have a better understanding of the functioning of units 24, 26 and 28 in FIGS. 3 and 4, also referring to FIGS. 6 to 9. The correspondence is made as follows:

block 24 or 240 and 241 of FIGS. 3 and 4 corresponds with the mechanism of FIG. 6, and like it are explained with reference to FIGS. 7A to 7C;

block 26 of FIG. 3 (260 and its associated components in FIG. 4) corresponds with blocks 78 to 81 in FIG. 8;

blocks 282 and 290 of FIG. 4 correspond with blocks 82 and 83 of FIG. 8;

block 28 in FIG. 3 (280 in FIG. 4) corresponds with blocks 84 to 90 in FIG. 8, and to blocks 94 to 96, for the management of one or more other indices in the same period, in periodic mode.

It will have been noted that the end of channel slot (FTC) is indicated (in the absence of reception in progress) by wire 201 (signal HTC) on FIGS. 3 and 4. Circuit 22 (the 221 to 229 assembly) serves to indicate the end of channel phase (FPC).

It should also be noted that, in the hardware embodiment of FIGS. 3 and 4:

the loading of the content of register 290 into register 260 is carried out at the end of a period, such that, for the next period, the division (dichotomous) is made on this value if the coupler has nothing to transmit (FIG. 8, test 72, output E=0) in general mode with free inputs or in periodic mode.

Figure 10:
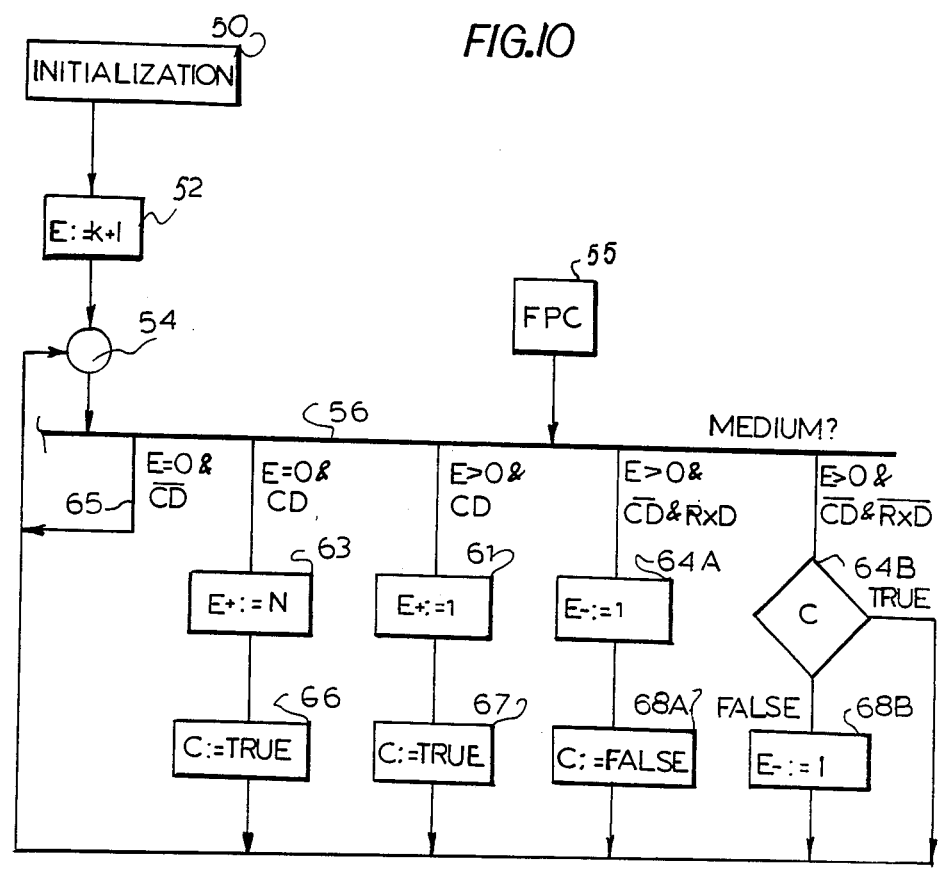
FIG. 10 is a variant of the diagram of FIG. 6.
Figure 11:
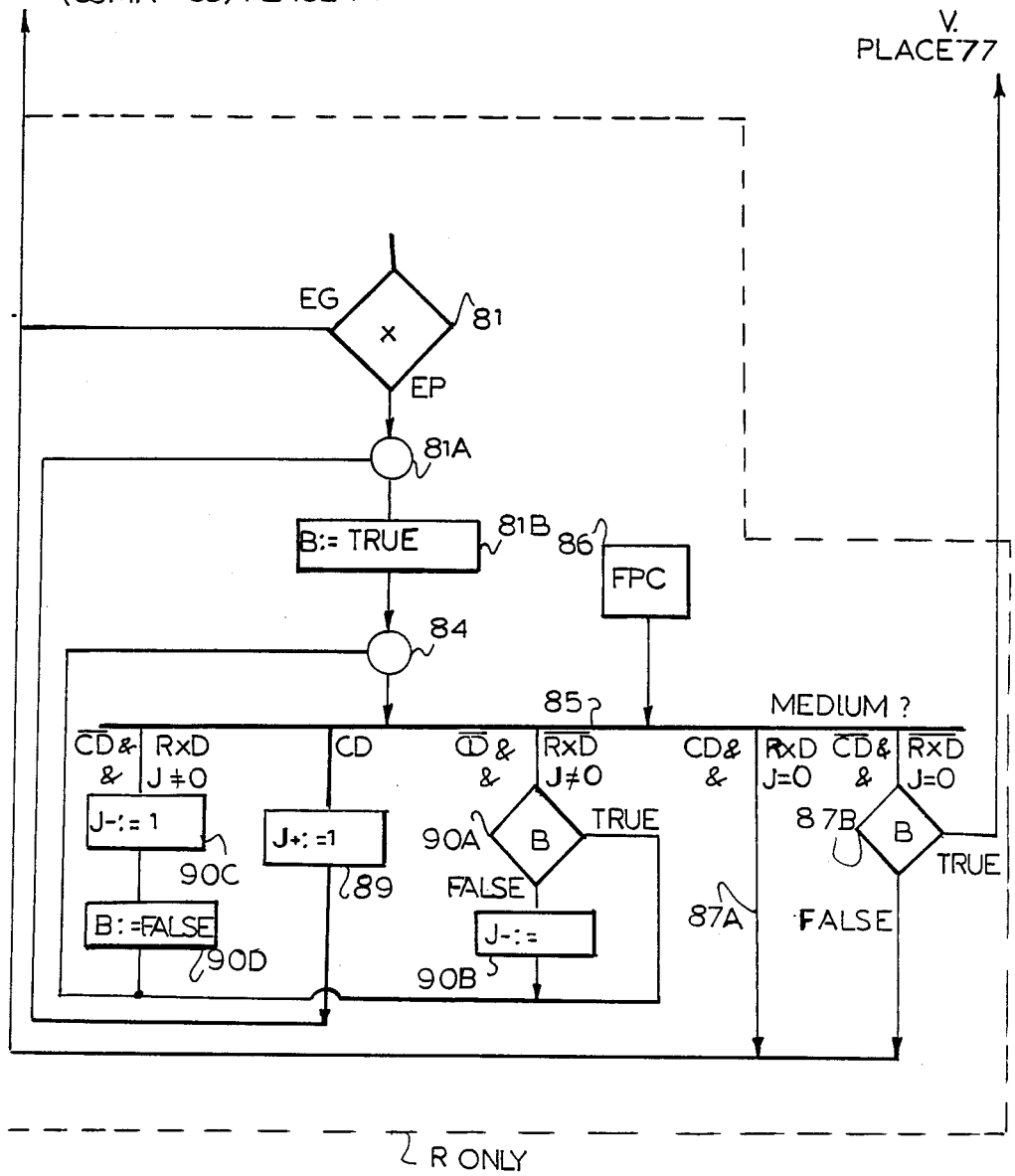
FIG. 11 is a variant of section R, outlined in broken line, of the diagram in FIG. 8.

The presence of one of the signals +:= and −:= corresponds with the placing of a marking check in places FTC (76, FIG. 8), FPC (86, FIG. 8), FPC (55 FIGS. 6 and 10), FPC (86 FIG. 11). We note that the fast hardware embodiment uses only FPC.

gate 275 (FIG. 4) defines the allocation of the current index to the winning sub-set.

Figure 9A:
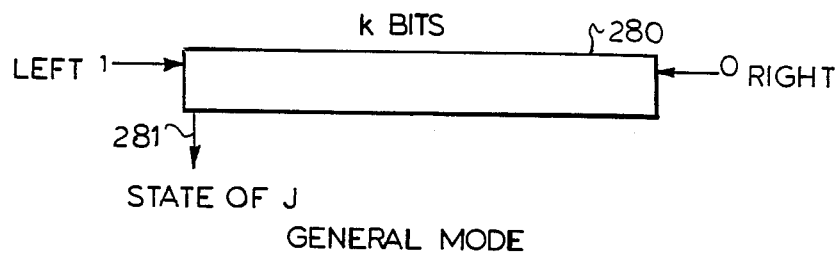
FIGS. 9A and 9B are diagrams of two embodiments of the second counter.
Figure 9B:
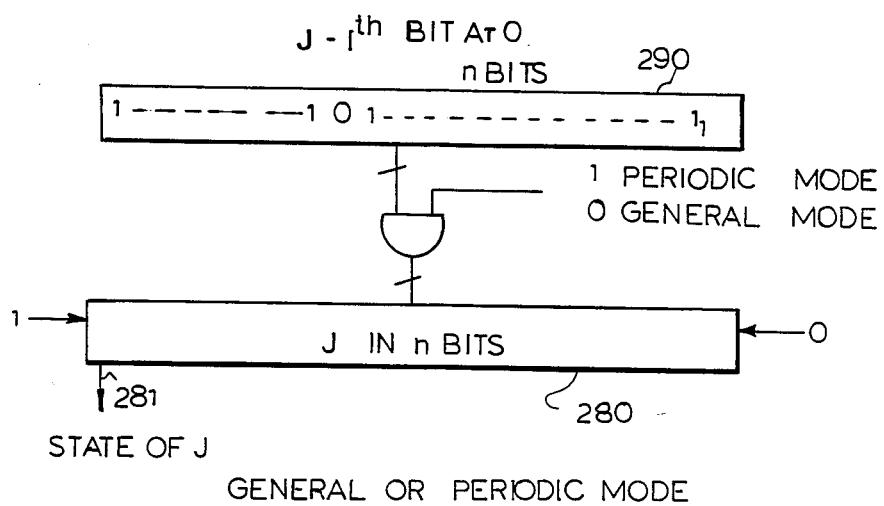

Finally, FIGS. 9A and 9B show how the counter j (28 or 280 and 290) can be produced from a shift register.

For general mode only (FIG. 9A), the register is first reset to zero. At each shift, it re-enters '1' at the left or '0' at the right. Its state is defined by the first bit, and the size of the register can be limited to k bits.

In order to work at choice in both modes (FIG. 9B), the size of the register increases to n bits. The operation remains the same in general mode.

In periodic mode, the value of j=x−1 (stage 83, FIG. 8) is loaded in the form of an n-bit word of which (in principle) only the $(j-1)^{th}$ bit is at '0', thus defining the new index. The same applies to stage 95, with a new value of j. Several new indices can of course be defined by several bits at zero in j.

We will now examine different variants of the process according to the invention, which apply essentially to the general mode and therefore do not concern the periodic mode.

When a collision occurs during a period in general mode, the Applicant has observed that there are at least two indices relating to active couplers, wishing to transmit, in the set X considered, which is then separated into two sub-sets G and P. From this it can be deduced that if one of these indices belong to the winning sub-set which represents an empty slot detected after the collision, they all therefore belong to the losing sub-set. In this case it is useless to allow all the couplers of the losing sub-set to transmit again after detecting the empty slot, since there is sure to be a collision. The invention therefore provides for the immediate application of the dichotomous separation to the losing sub-set, which saves a channel slot. This will therefore be carried out at least after every detection of an empty channel slot following a collision.

For this purpose, the diagram in FIG. 10 adds a modification with respect to that of FIG. 6 (with all that concerns the periodic mode removed).

Stages 61 and 63 remain the same. On the other hand, the condition $\overline{CD}$ and E positive is subdivided, depending on the state of RxD.

In addition, after stage 63, a stage 66 makes a Boolean value C go true. After stage 61, a stage 67 does the same thing.

After stage 64A, which has decremented the value of E by one step, a stage 68A makes the Boolean value C go false, if the absence of collision in fact corresponds to a successful transmission.

In the opposite case, where the absence of collision corresponds to a silence, a test 64B examines the Boolean C, which is of course stored in memory each time. If it is true, we return to place 54. If the Boolean C is false, stage 68B decrements E by one step.

Thus, Boolean C follows the appearance of sequences appropriate to optimization by making the distinction between a transmission channel phase without collision and an empty channel slot. The rule of change for Boolean C is the same as that for Boolean B that will be described later.

FIG. 11 shows the optimised mechanism for the management of authorizations to transmit again, or resolution of collisions, which corresponds with section R in FIG. 8, with all that concerns the periodic mode removed.

If the index in progress x after test 81 appears to belong to the losing set, we pass through a place 81A, in order to then put a Boolean B to the true value, by a stage 81D. We then arrive at place 84.

At the monitoring of the medium in 85, things remain the same as before in the presence of a collision, through stage 89 except that we return to 81A and not to 84. The other cases are subdivided.

If there is no collision and the value j is at 0, but transmission has taken place (RxD true), output 87A gives the same result as before. If there is no collision with j=0, but no signal passes on the channel, a test 87B examines the Boolean B. If this is false, the output is the same as through 87A. If it is true, we return to place 77 in FIG. 8.

If there is no collision and j is other than 0, and there is no longer any signal on the channel, a test 90A here again examines Boolean B. If it is true the output returns to place 84. If it is false the same is carried out but after having decremented the value j by one step.

Finally if there is no collision, and j is other than 0 but a message has passed on the transmission channel, then stage 90C decrements the value j by one step and stage 90D sets Boolean B to false before returning to place 84.

It will be understood that this Boolean B will take the true value in the case of a collision, and retain this value as long as no passage of a successful messge is detected (conditions RxD and $\overline{CD}$). And this Boolean is tested when an empty slot is detected ($\overline{CD}$ and $\overline{RxD}$ conditions) whatever the value of j.

When j=0, if B is false, then the previous channel phase corresponded to a successful message transmission. In this case, it is a normal transmission that is attemped without skipping the dichotomous stages. If B is true, we find ourselves on the other hand in a sequence allowing optimization and we proceed immediately with a dichotomous separation before examining if a new collision occurs.

When j is other than 0, if B is false, there is normally a decrementation of j. If B is true, this decrementation is not made. These two choices correspond with what has been described.

The present description is not extended to the processing of faults or errors in the couplers or in the common transmission channel. These processings are not in fact directly connected with the process according to the invention. To take an example, it is of course useful to provide appropriate fault indications and processings in abnormal cases such as:
CD and E positive in periodic mode (test 60, FIG. 6 and test 80, FIG. 8),
separation impossible (horizontal output of stage 80, FIG. 8),
j less than −1 (output, not shown, of test 96, FIG. 8).

The behaviour of the process according to the invention in the presence of faults is at least equivalent to that of known CSMA-CD processes.

Also, the invention can be embodied in hardware and/or software form, with a degree of integration of components chosen according to the application concerned.

Finally even though it is specifically aimed at the transmission of digital messages, the invention can also apply to the transmission of analogue messages.

We claim:

1. A method of exchanging digital messages between a plurality of stations through a common communication channel, comprising the steps of:
   (a) providing each station with at least one coupler interconnecting said station with said channel for feeding said station with messages received from said channel and responding to transmission requests from said station by attempting to transmit an associated message on said channel;
   (b) continuously monitoring said channel with said coupler to determine a condition of transition upon each termination of reception or transmission by said coupler on said channel, defining successive channel slots each of which begins at such a transition and terminates at the next transition or upon reaching a predetermined duration, while instituting a condition of collision whenever interference appears on said channel, due to simultaneous attempts at transmission on said channel by at least two couplers;
   (c) authorizing said coupler to transmit only within a channel slot with no reception up to the time of authorization and interrupting and invalidating a transmission by the coupler if a collision with the transmission by the coupler appears within the same channel slot;
   (d) allocating at least one respective index to each of said couplers, all such indexes belonging to a predetermined set of indexes;
   (e) providing all said couplers with a predetermined sequence for stepwise scanning of said set of indexes by successively restricted subsets of said set of indexes, until final subsets are reached each containing only one index;
   (f) providing all said couplers with means for up-/down counting from a predetermined value to a predetermined reference value, each coupler being authorized to transmit only if said counting means is at said predetermined reference value, the count being decremented upon termination of a channel slot with collision, and incremented upon termination of a channel slot without collision, and said count being preset at said predetermined value upon a collision occurring while said counting means is at its reference value;
   (g) effecting responses of at least those of the couplers, which have transmitted and generated said collisions while said counting means were at the respective reference values, by starting said stepwise scanning of said set of indexes, according to step change commands defined from the end of any channel slot in which there has been no reception or collision or the successful transmission of a message;
   (h) during each step of said stepwise scanning, authorizing only those couplers, which have an index belonging to the subset designated by the explored step, to transmit a message; and
   (i) returning said counts to said reference value only after complete resolution of each collision thereby authorizing the respective couplers to transmit freely, and resolving any collision in a limited time.

2. The method of claim 1, wherein the couplers whose automatic devices are in the working state carry out a second count which also changes at the rate of the ends of channel phases and depending on the presence or absence of collision during each channel phase, but within the period and with said predetermined and reference values of which at least one is different from those of the first count.

3. The method of claim 1, wherein the said stepwise scanning is structured as a binary decision tree, capable of subdividing the set of indices in successive dichotomies until they are obtained one by one, and with which is associated a scan/decision rule depending on the fact that the previous channel phase gave rise to a silence, a collision, or the successful transmission of a message; and wherein the predetermined and reference values of the first count are spaced by two steps, this count progressing by one count, in incrementation or decrementation with resepct to the reference value, depending on whether or not a collision occurred in the previous channel phase.

4. The method of claim 1, wherein the said stepwise scanning is structured as a binary decision tree, capable of subdividing the set of indices in successive dichotomies until they are obtained one by one, and with which is associated a scan/decision rule which comprises:

the passage to the other sub-set of the dichotomy in progress, in the presence of a channel phase of silence or of a channel phase of successful transmission, or a new dichotomy of the sub-set in the process of examination, in the presence of a channel phase of collision; wherein the predetermined and reference values of the said count are spaced by two steps, this count progressing by one count in incrementation or decrementation with respect to the reference value, depending upon whether or not a collision occurred in the previous channel phase; and wherein those of said couplers which have automatic devices in a working state carry out in steps of a sequence during which they are not authorized to transmit, a second count, within the period, with predetermined and reference values which are the same and which progresses by one step in incrementation or decrementation with respect to its own reference value in a similar manner to the first count, so that this second count enables a coupler to determine that it has reintegrated a sub-set of said sequence that authorizes it to transmit.

5. The method of claim 4, wherein, in the presence of a channel phase of silence, the scan/decision rule includes a new immediate dichotomy of the other sub-set of the dichotomy in progress.

6. The method of claim 4, wherein in the presence of a collision during which their counts are at the reference value, all the couplers put respective automatic devices into the working state; and wherein, in the rest of the period, the transmission of a message is also authorized by such couplers for the indices belonging to a sub-set which have given rise to a collision not yet resolved.

7. The method of claim 3, wherein the said binary tree is defined according to the successive bits of the indices, and the order in which they occur.

8. The method of claim 3, wherein each coupler is allocated several binary indices, which correspond respectively with different priority levels, and in that the said scan/decision rule scans the index sub-sets in the order of priority.

9. The method of claim 1, wherein the said stepwise scanning is a series of all the indices, taken one by one, and the difference between the predetermined and reference values of the first count is at least equal to the number of steps in the said series, this count progressing towards the reference value at each end of channel phase without collision.

10. The method of claim 1, wherein the said stepwise scanning is a series of all the indices, taken one by one, and the difference between the predetermined and reference values of the first count is at least equal to the number of steps in the said series, this count progressing towards the reference value at each end of channel phase without collision; and wherein each coupler is allocated several indices, which enables a coupler to pass at least one other message with another index within the same period.

11. The method of claim 1, wherein a coupler not having received a message transmit request from its station is considered as adapted to transmit a 'nil' message, all the couplers thus making respective automatic devices go simultaneously into the working state or period.

12. The method of claim 1, wherein for the couplers entering into service, the first count of these couplers is set to a value at least equal to the maximum number of steps in the predetermined sequence.

13. A device for the implementation of a process for the transmission of messages between different stations, of the type called CSMA-CD, in which:

each station is provided with at least one coupler which connects it to a common distributed transmission channel;

each coupler transmits and receives on said common channel in asynchronous mode, defining a transition at each end of transmission or reception;

each coupler continuously monitors the said common channel and examines it for a predetermined time defining a channel slot, after each transition; and a coupler can only begin to transmit a message, at the request of its station, in the absence of any signal on the channel, whereas each coupler interrupts and invalidates its transmission if, during the corresponding channel slot, a signal indicating a collision appears, such as an interference, manifesting a simultaneous start of transmission by several couplers;

each of said couplers comprising:

a transmission channel test circuit providing at least three logic signals respectively representing a transmission in progress by the coupler, a reception in progress on the channel and a collision detected on the channel; and a control circuit which provides a link between the rest of the station and the test circuit depending on signals received on the channel, and message transmit requests coming from the station, the control circuit including:

means for storing at least one binary index that belongs to the respective coupler, and at least one message transmit request relating to that index;

channel phase logic means to define the ends of channel slots, as well as ends of channel phases corresponding either to an end of channel slot in which silence or a collision occurred, or to the end of the successful transmission of a message;

first counting means for counting the rate of the ends of channel phases up to a selected reference value;

multistate logic means defining an automatic device having a rest state and a working state defining a period, in which the multistate logic means produces a predetermined sequence of index sub-sets, structured to result, following successive choices, in just one of the indices, and thus scanning the complete set of indices, the said sequence including a maximum number of steps which depends on its structure and on the total number of indices;

means only authorizing the coupler to freely transmit if the first count is at its reference value;

means for reacting to the presence of a collision when the first count is at its reference value by setting that first count to a predetermined value, and putting the automatic device into its working sate, or period; and means only then authorizing the coupler to transmit if its index belongs to the sub-set designated each time by the automatic device, the predetermined value and the reference value being selected such that the count only returns to the reference value after the complete resolution of the collision that caused the period, the couplers then being again authorized to freely transmit, while the automatic devices return to their rest state, thereby enabling any collision to be resolved within a limited time.

14. The device defined in claim 13 wherein said control circuit further includes second counting means for counting at the rate of the ends of channel phases, and depending on the presence or absence of collisions during each channel phase, but within the period, and with predetermined and reference values of which at least one is different from those of the first counting means.

15. The device defined in claim 13 wherein the multistate logic means are arranged in order to define a predetermined sequence, structured as a binary decision tree, capable of sub-dividing the set of indices in successive dichotomies until they are obtained one by one, and with which is associated a scan/decision rule depending on the fact that the previous channel phase gave rise to a silence, a collision, or the successful transmission of a message, and wherein the predetermined and reference values of the first count are spaced by two steps, this count progressing by one step, in incrementation or decrementation with respect to the reference value, depending on whether or not a collision occurred in the previous channel phase.

16. The device defined in claim 13 wherein the multistate logic means are arranged in order to define a predetermined sequence, structured as a binary decision tree, capable of subdividing the set of indices in successive dichotomies until they are obtained one by one, and with which is associated a scan/decision rule which comprises: the passage to the other sub-set of the dichotomy in progress, in the presence of a channel phase of silence, or a channel phase of successful transmission, or a new dichotomy of the sub-set in the process of examination, in the presence of a channel phase of collision; said means for setting said first count to a predetermined value is arranged to set a forced value spaced by two steps from said reference value; said first counting means is arranged to progress by one step in incrementation or decrementation with respect to the reference value depending on whether or not a collision occurred in the previous channel phase; said control circuit means includes second counting means arranged to carry out within the period and in steps of said sequence during which the coupler is not authorized to transmit, a second count with predetermined and reference values which are the same and which progresses by one step in incrementation or decrementation with respect to its own reference value in a similar manner to the first count, so that by this second count the coupler determines that it has reintegrated a sub-set of said sequence that authorizes it to transmit.

17. The device defined in claim 16, wherein the arrangement is such that, in the presence of a channel phase of silence, the scan/decision rule includes a new immediate dichotomy of the other sub-set of the dichotomy in progress.

18. The device defined in claim 16, wherein the arrangement is such that in the presence of a collision during which its first count is at the reference value the coupler systematically puts its automatic device into the working state, and in that, in the rest of the period, the transmission of a message by the coupler remains authorized for indices belonging to a sub-set having given rise to a collision not yet resolved.

19. The device defined in claim 15, wherein the multistate logic means are so arranged that the said binary tree is defined according to the successive bits of the indices, and the order in which they occur.

20. The device defined in claim 15 wherein the multistate logic means are so arranged that the said binary tree is defined according to the successive bits of the indices, and the order in which they occur, and include means forming a shift register of capacity at least equal to the maximum number of significant bits present in the indices of the predetermined set, and means for comparing the content of the register with the current index.

21. The device defined in claim 20 wherein the arrangement is such that in response to a period, the coupler loads its current index into the register which is a shift register activated at each dichotomy, the comparison relating to the bit located at the useful end of the register on the shifting side.

22. The device defined in claim 15 wherein the arrangement is such that the coupler initially receives several indices of different priority, the said scan/decision rule scans the index sub-sets in the order of priority, and the message transmit requests are each associated with one of the indices depending on their priority.

23. The device defined in claim 13 wherein the arrangement is such that the said predetermined sequence is a series of all the indices taken one by one, and in that the difference between the predetermined and reference values of the first count is at least equal to the number of steps in the said sequence, this count progressing towards the reference value at each end of channel phase without collision.

24. The device defined in claim 14 wherein the arrangement is such that the said predetermined sequence is a series of all the indices taken one by one, and in that the difference between the predetermined and reference values of the first count is at least equal to the number of steps in the said sequence, this count progressing towards the reference value at each end of channel phase without collision, and wherein the coupler is allocated with several indices, which enables the coupler to pass at least one other message with another index within the same period.

25. The device defined in claim 13 wherein the arrangement is such that, if the coupler has not received a message transmit request from its station, the coupler behaves as though it wishes to transmit a 'nil' message, thus systematically putting its automatic device into the working or period state since a collision occurs during the rest state of that same automatic device.

26. The device defined in claim 13 wherein at least one of the first and second means of counting includes a shift register.

27. The device defined in claim 13, wherein the arrangement is such that, for its entry into service, the first count of the coupler is set to a value at least equal to the maximum number of steps of the predetemined sequence.

28. The device defined in claim 15 wherein the said multi-state logic means and the said counting means are capable of being switched to an alternative mode of operation wherein the arrangement is such that the said predetermined sequence is a series of all the indices taken one by one, and the difference between the predetermined and reference values of the first count is at least equal to the number of steps in the said sequence, this count progressing towards the reference value at each end of channel phase without collision.

29. The device defined in claim 13, wherein said device has several of said couplers connected to a common distribution transmission medium.

* * * * *